(12) United States Patent
Crocker

(10) Patent No.: US 8,994,724 B2
(45) Date of Patent: *Mar. 31, 2015

(54) METHODS AND SYSTEMS FOR GENERATING CONTINUOUS SURFACES FROM POLYGONAL DATA

(75) Inventor: Gary Arnold Crocker, San Diego, CA (US)

(73) Assignee: IntegrityWare, Inc., San Diego, CA (US)

( * ) Notice: Subject to any disclaimer, the term of this patent is extended or adjusted under 35 U.S.C. 154(b) by 885 days.

This patent is subject to a terminal disclaimer.

(21) Appl. No.: 13/027,092

(22) Filed: Feb. 14, 2011

(65) Prior Publication Data

US 2012/0206456 A1  Aug. 16, 2012

Related U.S. Application Data

(60) Provisional application No. 61/397,722, filed on Dec. 17, 2010.

(51) Int. Cl.
*G06T 17/20* (2006.01)
*G06T 17/30* (2006.01)

(52) U.S. Cl.
CPC ................................. *G06T 17/30* (2013.01)
USPC ........................................ 345/420; 345/419

(58) Field of Classification Search
USPC .......................................................... 345/420
See application file for complete search history.

(56) References Cited

U.S. PATENT DOCUMENTS

| | | | |
|---|---|---|---|
| 6,603,473 B1 * | 8/2003 | Litke et al. ..................... | 345/420 |
| 7,400,323 B2 * | 7/2008 | Nigro ............................. | 345/420 |
| 7,595,799 B2 * | 9/2009 | Nigro ............................. | 345/420 |
| 7,747,305 B2 * | 6/2010 | Dean et al. ..................... | 600/407 |
| 2006/0155418 A1 * | 7/2006 | Bradbury et al. ............. | 700/182 |
| 2008/0143714 A1 * | 6/2008 | Huang et al. .................. | 345/420 |

* cited by examiner

*Primary Examiner* — Kimbinh T Nguyen

(57) ABSTRACT

Methods and systems for generating surface data from polygonal data are disclosed. The methods and systems receive polygonal data which describe discrete points on an object. The methods and systems analyze and use the data to calculate and define a continuous BREP object which accurately represents the original polygonal object. In some embodiments, the generated BREP is G2 continuous at substantially all points.

23 Claims, 25 Drawing Sheets

METHODS AND SYSTEMS FOR GENERATING CONTINUOUS SURFACES FROM POLYGONAL DATA

CROSS REFERENCE TO RELATED APPLICATIONS

This application claims the benefit of application No. 61/397.722, filed Dec. 17, 2010, entitled "Methods and Systems for Generating Continuous Surfaces from Polygonal Data," which is incorporated herein by reference. This application is related to application entitled "Methods and Systems for Generating Continuous Surfaces from Polygonal Data," filed herewith.

BACKGROUND

1. Field

The described technology relates to systems and methods of generating continuous surfaces from data of a polygonal model provided, from, for example, a 3-D polygonal or Subdivision surface (Sub-D) modeling tool.

2. Description of the Related Technology

Polygonal model data is created with, for example, a 3-D CAD software tool by, for example, a designer. The polygonal model or polygonal mesh includes discrete data points describing one or more surfaces or objects. Polygonal models are convenient for design work at least because they define the surface or object at a degree of detail convenient for the designer to work with. The shape of the surface or object is defined by the data points, and the surface between the data points is perceived, but is not represented in the data. This allows for the CAD system to function quicker because of a significantly reduced data set representing the surface or object, while providing the designer enough detail to manipulate to achieve a desired design.

Once the designer has finished the design, the polygonal data can be used, for example, as the basis for manufacturing a physical object or for generating an image of the designed object. To manufacture the object, or analyze it, or to generate the image, the mesh data is often not sufficient. For a physical object or a realistic image, a BREP object containing one or more surfaces must be defined. The surfaces are preferably Non-uniform rational B-spline (NURBS). NURBS is a mathematical model commonly used to represent curves and surfaces, which are either analytic or freeform. A BREP (Boundary REPresentation) may be understood to be a geometric and topological representation used, for example, in CAD applications that links together curves and surfaces to form either a solid (closed volume) or a shell (open).

For accurate CAD models, the continuity of the interior surface and the continuity between adjacent surfaces are important characteristics of the final product. Mathematically, for adjoining surfaces, continuity grades of G1 and G2 are defined. Each point on the final BREP object is a point on one or more surfaces. The continuity of the two surfaces at a point where they touch is characterized as G1 if the surfaces share a common tangent plane at the point. The continuity of two surfaces at the point is characterized as G2 if the surfaces share both a common tangent plane and common curvature at the point. For high quality surfaces G2 continuity at most points on the BREP object is highly desirable in terms of design aesthetics and manufacturability.

SUMMARY OF CERTAIN INVENTIVE ASPECTS

Various aspects of certain embodiments of methods and systems for generating surface data from polygonal data are discussed. The methods and systems receive polygonal data which describe discrete points on an object. The methods and systems analyze and use the polygonal data to calculate and define a continuous BREP object which accurately represents the object.

One aspect is a method of producing BREP data from electronic polygonal data. The method includes accessing the polygonal data with a computer, and identifying a plurality of data points, where each identified data point corresponds to a non-valence 4 vertex in the polygonal data. The method also includes generating one or more continuous surfaces, where each generated surface is generated based on points corresponding to vertices in the polygonal data which are near one of the non-valence 4 vertices corresponding to an identified data point. The method also includes generating the BREP data based at least in part on the continuous surfaces, improving the continuity of the BREP data using the continuous surface, and storing the BREP data in a computer readable data storage.

Another aspect includes a method of producing BREP data from electronic polygonal data. The method includes accessing the polygonal data with a computer, where the polygonal data defines a mesh of polygonal data points. The method also includes generating a plurality of continuous curves based on the polygonal data, identifying a plurality of first data points corresponding to non-valence 4 vertices in the polygonal data, and identifying a plurality of second data points corresponding to polygonal data having a third derivative greater than a threshold. The method also includes based at least in part on the continuous curves, the first data points, and the second data points, generating a plurality of BREP surface boundaries defining one or more continuous BREP surfaces, generating the BREP data based at least in part on the continuous BREP surfaces, and generating one or more additional continuous surfaces, where each additional surface is generated based on points corresponding to vertices in the polygonal data which are near one of the non-valence 4 vertices corresponding to an identified non-valence 4 data point. The method also includes improving the continuity of the BREP data using the continuous additional surfaces, and storing the improved BREP data in a computer readable data storage.

DETAILED DESCRIPTION OF CERTAIN INVENTIVE EMBODIMENTS

Various aspects and features of methods and systems are described herein with reference to the accompanying drawings, which show certain exemplary embodiments. The described embodiments may be modified in various ways, without departing from the spirit or scope of the present invention. In addition, the described embodiments have multiple features and aspects, no single one of which is solely responsible for the desirable characteristics thereof. Furthermore, no single feature or aspect is essential to practicing the methods and systems described herein. Furthermore, various features and aspects of the embodiments may be combined in embodiments not specifically described.

Various inventive aspects of certain embodiments of methods and systems for generating BREP object data from polygonal data are discussed. The methods and systems receive polygonal data which describe discrete points on a object. The methods and systems analyze and use the data to calculate and define a BREP which accurately represents the polygonal object. For example, the methods and systems may receive polygonal data 1, such as that represented in FIG. 1 and generate a BREP 2, such as that represented in FIG. 2. Among other beneficial aspects, the BREP object defined by the methods and systems may be G2 continuous at all or substantially all points on the BREP object, and may be G1 continuous or substantially G1 continuous at any non-G2 continuous points. In addition, in some embodiments, the BREP object defined by the methods and systems interpolates all or substantially all of the points in the polygonal data. In some embodiments, the BREP object defined by the methods and systems includes all or substantially all of the points in the polygonal data. The methods and systems reliably define BREP objects for polygonal data of a wide variety of polygonal data. While quadrilateral polygonal data is most efficiently processed, some triangular polygonal data may be effectively handled. The BREP objects produced may contain mostly naturally trimmed (rectangular bounded) surfaces with a layout similar to what might be created by a designer in a CAD system. The flow lines of the resulting BREP curves and surfaces may closely match the flow lines of the straight edges on the original data mesh. Surfaces may be roughly rectangular, two manifold, and/or curved. Additionally, surfaces can be of any type, for example, NURBS surface, Bezier surface, Coons surface, Gregory Patch, etc.

Figure 1:
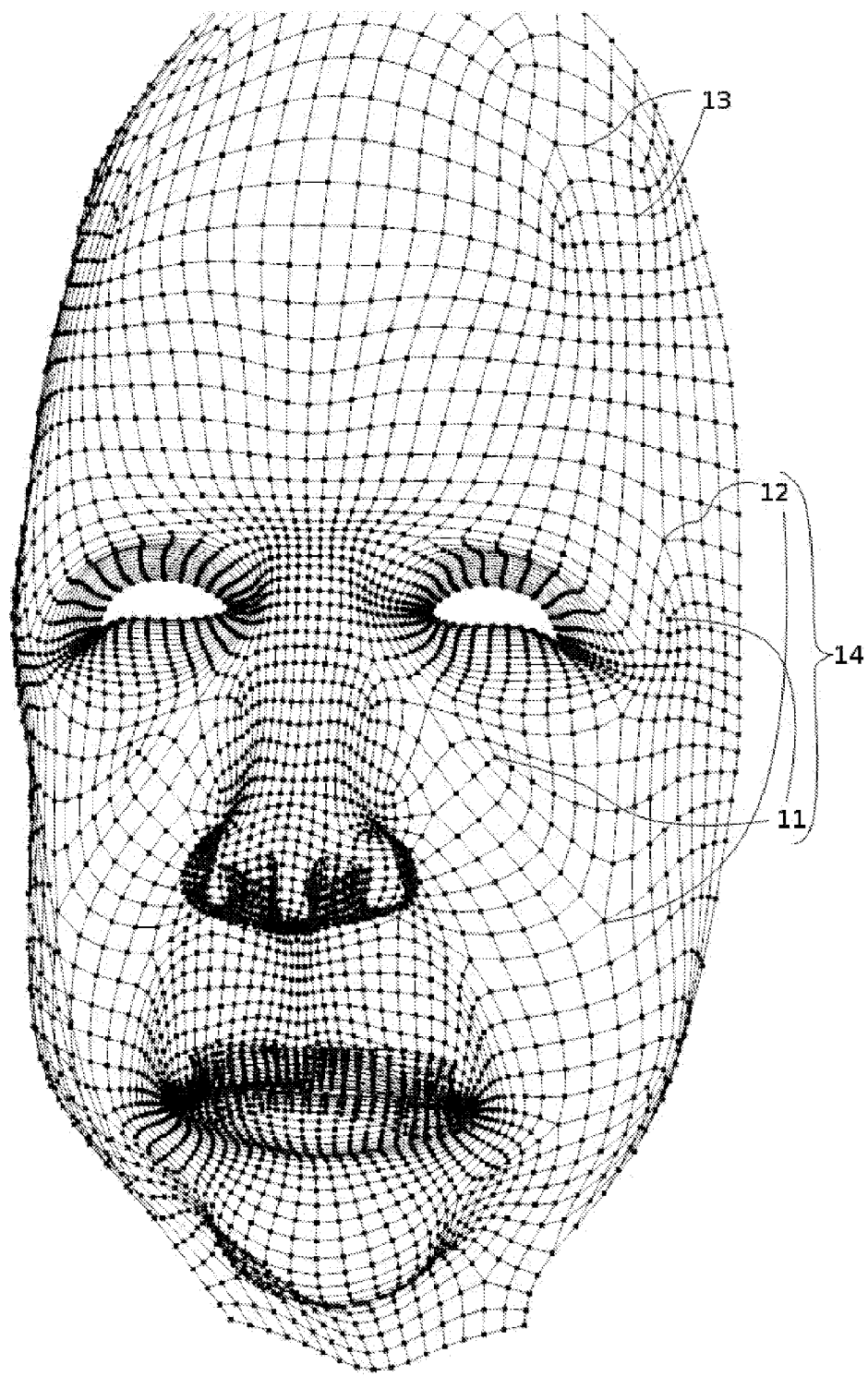
FIG. 1 is a graphical illustration of polygonal data.

A polygonal model or polygonal mesh can be characterized as being, for example, triangular or quadrilateral. In a predominantly triangular mesh, the polygons defined by the data are generally triangular. In a predominantly triangular mesh most polygons are defined by three data points, and each data point is generally a vertex of six triangles. The number of polygons defined by a point is referred to as the valence of that point. The valence of that point is also the number of polygon sides or lines which connect to that point. Accordingly, in a predominantly triangular mesh, most of the data points have a valence of six. In a predominantly quadrilateral mesh, the polygons defined by the data are generally quadrilateral. In a predominantly quadrilateral mesh most polygons are defined by four data points, and each data point is generally a vertex of four quadrilateral polygons. Therefore, in a predominantly quadrilateral mesh, most of the data points have a valence of four. FIG. 1 shows polygonal data 1, which is a predominantly quadrilateral mesh. Certain valence 3 points 11, valence 4 points 12, and valence 5 points 13, are indicated.

Figure 2:
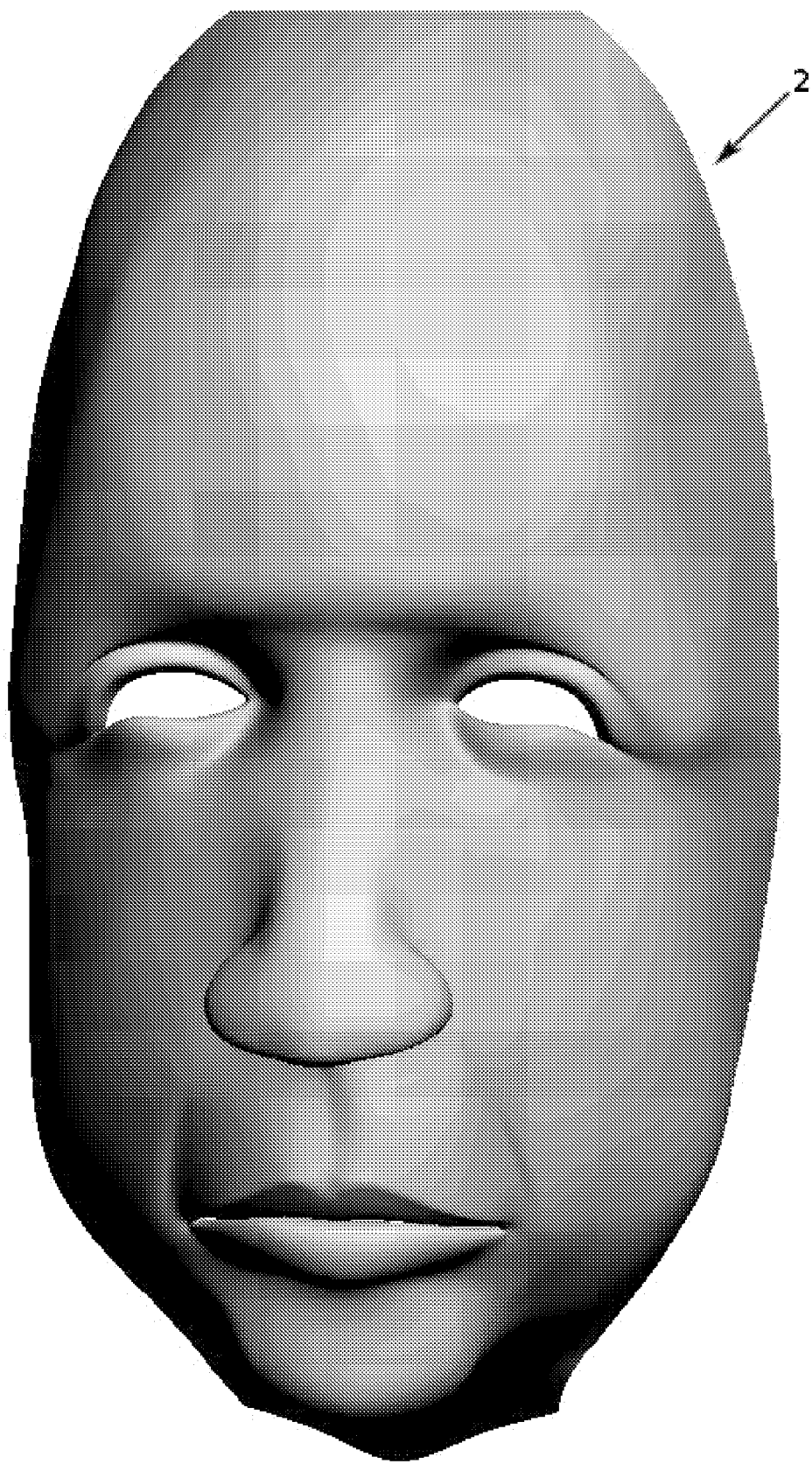
FIG. 2 is a graphical illustration of continuous BREP object data generated from the polygonal data of FIG. 1.

In some embodiments, methods and systems receive predominantly quadrilateral polygonal data representing an object. As indicated above, FIG. 1 shows an example of such data, and FIG. 2 shows an example of a continuous BREP object 2 corresponding to the surface represented by the polygonal data 1 shown in FIG. 1. In order to generate the continuous BREP object 2, in some embodiments the polygonal data 1 is analyzed and continuous surfaces are formed. The collection of continuous surfaces corresponds to the BREP object 2 represented by the polygonal data 1, where each surface corresponds to a unique portion of the BREP object 2 represented by the polygonal data 1. Each of the continuous surfaces forms a portion of the continuous BREP object 2 to be generated. To improve the continuity of the generated BREP object 2, the boundaries and vertices of the continuous surfaces are modified. The result is a continuous BREP object 2 corresponding to the BREP object represented by the polygonal data 1.

Figure 3:
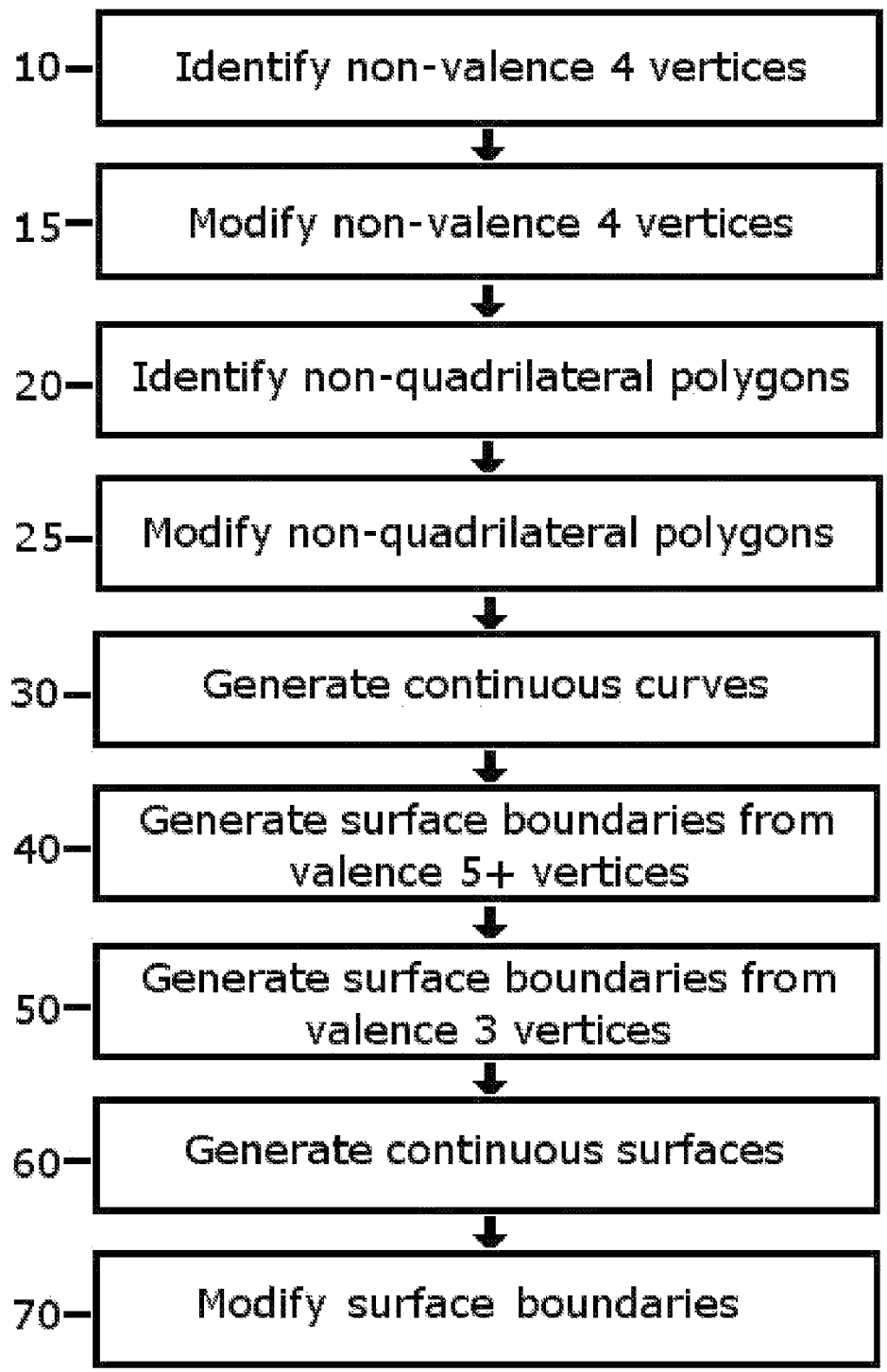
FIG. 3 is a flow chart of a method used to generate the continuous BREP object data of FIG. 2.

FIG. 3 is a flow chart describing a method of generating BREP object data, such as that represented in FIG. 2, from polygonal data, such as that represented in FIG. 1. The method of FIG. 3 is implemented with a computer system, which accesses instructions for performing the method stored on a computer readable medium, such as a memory or data storage device. The instructions, when executed by the computer, cause the method of FIG. 3 to be performed. The polygonal data may be generated with a computer CAD system and may be stored in a non-transitory computer readable medium, such as a memory or data storage device. The computer system configured to perform or to be used to perform the method of FIG. 3 accesses the polygonal data to perform the method.

At 10 of FIG. 3, polygonal data 1 is analyzed to identify vertices which are not valence 4. Several valence 3 vertices 11 and several valence 5 vertices 12 are indicated in FIG. 1. Some polygonal data has vertices with valence higher than 5. In some instances, as a result of the method used to generate the polygonal data 1, vertices having valence 3 or having valence higher than 4 often correspond to points in the polygonal data 1 with poor continuity. As discussed in more detail below, adjustments may be made to the polygonal data 1 at or near the non-valence 4 points 14 to improve continuity of the generated BREP object. In some polygonal data 1, vertices at a boundary of the surface represented may be non-valence 4. In some embodiments, such non-valence 4 boundary vertices are excluded from the vertices identified as non-valence 4 at 10 of FIG. 3.

Figure 4:
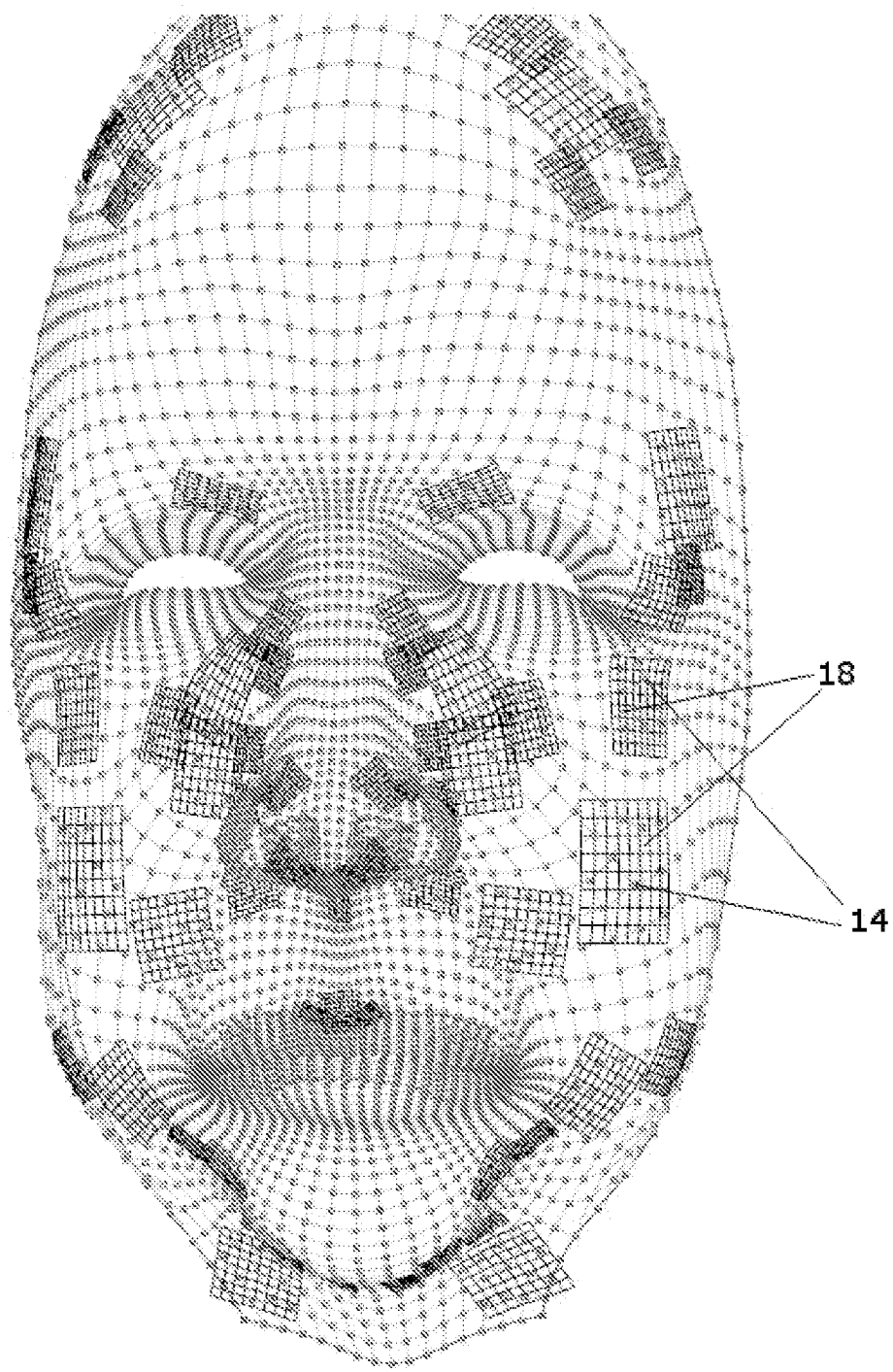
FIG. 4 is a graphical illustration of the polygonal data of FIG. 1 with surfaces for non-valence 4 vertices.

At 15 of FIG. 3, the non-valence 4 vertices 14, or data points corresponding to the non-valence 4 vertices 14 are modified based on nearby vertices to improve continuity across points on the generated BREP object corresponding to the non-valence 4 vertices 14. In some embodiments, as shown in FIG. 4, continuous surfaces 18 are generated using vertices which are near the non-valence 4 vertices 14 whose continuity is to be improved. For example, all and/or only the vertices adjacent to a non-valence 4 vertex 14 can be used to generate a G2 continuous surfaces 18. In some embodiments, the non-valence 4 vertex 14 itself is not used in the BREP object or surface generation. In some embodiments, they are. In some embodiments, vertices used to generate the continuous surfaces 18 include vertices within 2, 3, 4, 5, or about 10 vertices of the non-valence 4 vertex 14. In some embodiments a group of vertices which substantially surrounds the non-valence 4 vertex 14 are included. In some embodiments, vertices used to generate the continuous surfaces 18 are limited to vertices within 2, 3, 4, 5, or about 10 vertices of the non-valence 4 vertex 14. In some embodiments, vertices used to generate the continuous surfaces 18 include about 0.001%, about 0.01%, about 0.1%, or about 1% of vertices in the polygonal data nearest the non-valence 4 vertex 14. In some embodiments, vertices used to generate the continuous surfaces 18 are limited to about 0.001%, about 0.01%, about 0.1%, or about 1% of vertices in the polygonal data nearest the non-valence 4 vertex 14.

Some techniques for generating continuous surfaces include variational surfacing and/or least squares fitting. Other surface generation techniques may additionally or alternatively be used, such as other ordered data fitting techniques. In some embodiments, the generated surface is a NURBS surface. Alternatively, the generated surface may, for example, be another type of surface, such as a Bezier surface, a Coons surface, a Gregory Patch, etc.) The generated surface may be G2 internally continuous. In some embodiments, the surface is not G2 internally continuous. Internal surface continuity is generally the continuity of a surface inside of the surface boundary.

Once the surface is generated, the non-valence 4 vertex 14 is projected onto the surface 18 at a projection point where the surface is normal to the position of the non-valence 4 vertex 14. The projection point is then used to modify the non-valence 4 vertex 14 in the polygonal data. For example, the non-valence 4 vertex 14 in the polygonal data may be replaced with data representing the position of the projection point, data representing the position of the projection point may be stored in data representing the BREP surface to be generated, or data representing the position of the projection point may be stored for later use in calculating the data representing the BREP surface to be generated. In some embodiments, the normal vector including the projection point and the unmodified non-valence 4 vertex 14 is stored and used in the generation of 3D curves.

At 20 of FIG. 3, the polygonal data is analyzed to identify polygons which are not quadrilateral. Some polygonal data has polygons which are triangles, or have more than 4 sides. In some instances, polygons which are not quadrilateral may correspond to points in the generated surface with poor continuity. As discussed in more detail below, adjustments may be made to the polygonal data at or near the non-quadrilateral polygons to improve continuity of the generated BREP object.

At 25 of FIG. 3, the non-quadrilateral polygons are modified based on nearby vertices to improve boundary continuity across points on the generated BREP object corresponding to the non-quadrilateral polygons. Vertices included for use to improve the boundary continuity may be included for reasons similar to those discussed above regarding inclusion of vertices for improving continuity of the generated BREP data near non-valence 4 vertices. In some embodiments, continuous surfaces are generated using vertices which are near the non-quadrilateral polygons whose continuity is to be improved. For example, all the vertices adjacent to a non-quadrilateral polygon can be used to generate a G2 continuous surface. In some embodiments, the vertices of the non-quadrilateral polygon itself are not used in the surface generation. In some embodiments, they are. In some embodiments, vertices within two vertices of the non-quadrilateral polygon are used to generate the continuous surface. Such surfaces may be similar to those shown in FIG. 4 near non-valence 4 vertices.

Once the surface is generated, the vertices of the non-quadrilateral polygon are projected onto the surface at points where the surface is normal to the position of each of the vertices. The surface points of the projection are then used to modify the vertices of the non-quadrilateral polygon in the polygonal data. For example, the vertices of the non-quadrilateral polygon in the polygonal data may be replaced with data representing the positions of the surface points, data representing the positions of the surface points may be stored in data representing the surface to be generated, or data representing the positions of the surface points may be stored for later use in calculating the data representing the surface to be generated. In some embodiments, the normal vectors including the surface points and the unmodified non-quadrilateral vertices are stored.

Figure 5:
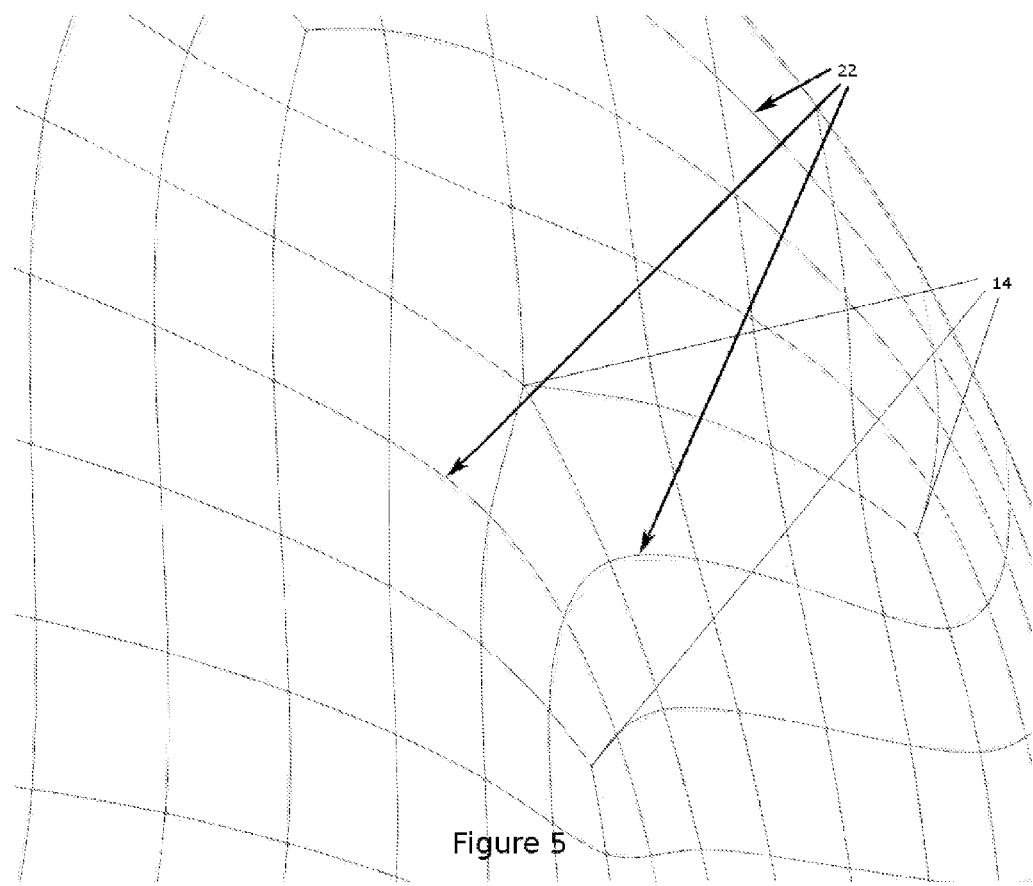
FIG. 5 is a graphical illustration of continuous curves generated based on the polygonal data of FIG. 1.

At 30 of FIG. 3, the valence 4 vertices 13 are used to create continuous curves. As shown in FIG. 5, continuous curves 22 including the points of the polygonal data vertices are generated. Alternatively, continuous curves may be generated based on the polygonal data, but not necessarily including the polygonal data points. A technique, such as least squares fitting, may be used to generate the curves 22 through the valence 4 vertices. Other techniques may additionally or alternatively be used. In some embodiments, the generated curves 22 are NURBS curves. The generated curves 22 may be G2 continuous. In some embodiments, the curves 22 are not G2 continuous. The curves 22 have end points which are at the boundaries of the polygonal data or which are at non-valence 4 vertices 14. On non-valence 4 vertices, modified points from the surfaces generated in 15 of FIG. 3 and optionally the corresponding surface normals may be used to generate the curves 22. A plane may be defined by the center point (of the generated surface) and the corresponding surface normal at that point. The curves 22 may be generated so that they are tangent at the common center point so that their curve tangents lie substantially on the same plane. The center point is used as an end point of the curves 22. The generated curves 22 are used to define the continuous surfaces discussed above.

Figure 6:
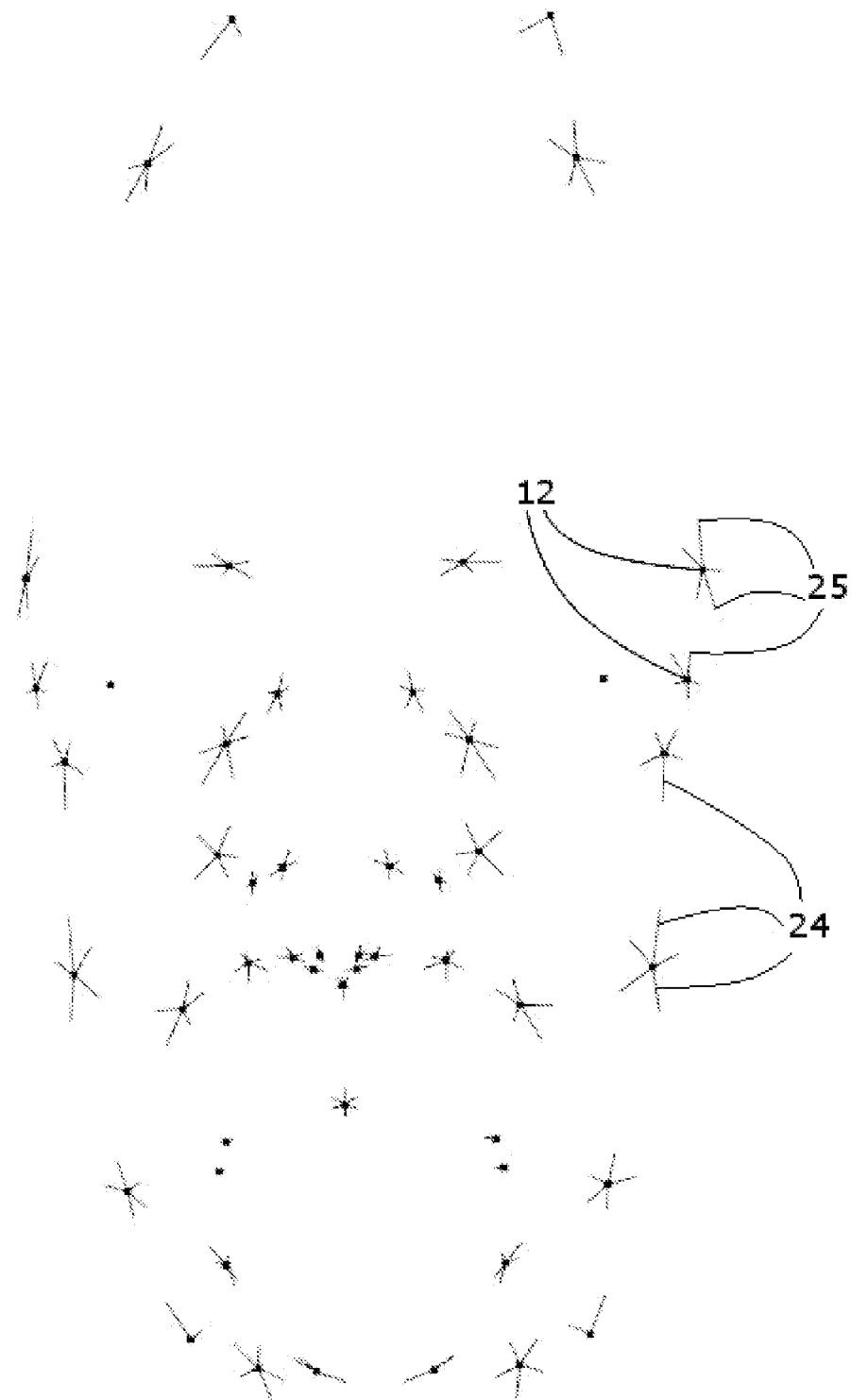
FIGS. 6-13 are graphical illustrations of an embodiment of surface boundary generation.

At 40 of FIG. 3 surface boundaries are defined using the vertices 12 having valence 5 and higher. In some embodiments, data points corresponding to vertices 12 having valence 5 and higher are used to define the surface boundaries. As shown in FIG. 6, boundary segments 24 are formed. The boundary segments start with the vertices 12 having valence 5 and higher and end with the vertices 25 adjacent to the vertices 12 having valence 5 and higher, and include the continuous curve between the start and end vertices. To further define the surface boundaries, the boundary segments 24 are conditionally extended until no boundary segments 24 may be further extended. The rules for conditionally extending the boundary segments may or may not include:

Boundary segments 24 are extended from valence 4 vertices so as to continue along the same continuous curve generated in 30 of FIG. 3.

Boundary segments 24 are not extended if the last included vertex is non-valence 4.

Curves along the boundary of the polygonal data form boundary segments.

Boundary segments 24 are not extended if the last included vertex is in another boundary segment.

Boundary segments 24 are not extended if areas of high curvature change are found To determine areas of high curvature change, a mathematical test, such as a threshold on a third derivative at the next or last included vertex may be used. For example if the third derivative at the last included vertex is greater than a threshold, the boundary segment 24 may not be extended. Alternatively, if the second derivative at the included vertex is greater than the second derivative at the previous vertex of the boundary segment 24 by a factor greater than a threshold, such as about 1.5, about 2, or about 5, the boundary segment 24 may not be extended.

In some embodiments, if a boundary segment 24 is terminated at a vertex of high curvature change, which has a valence of 4, additional boundary segments (not shown) are generated. The additional boundary segments start from the vertex of high curvature change, and extend in both directions along the continuous curve which intersects the continuous curve along which the terminated segment 24 was being extended. In some embodiments, a boundary segment is additionally started from the vertex of high curvature change and is extended in the direction along the continuous curve along which the terminated segment 24 was being extended. Extending the boundary segments from the data points corresponding to vertices of high curvature change may be performed according to the rules for extending boundary segments discussed above.

Figure 7:
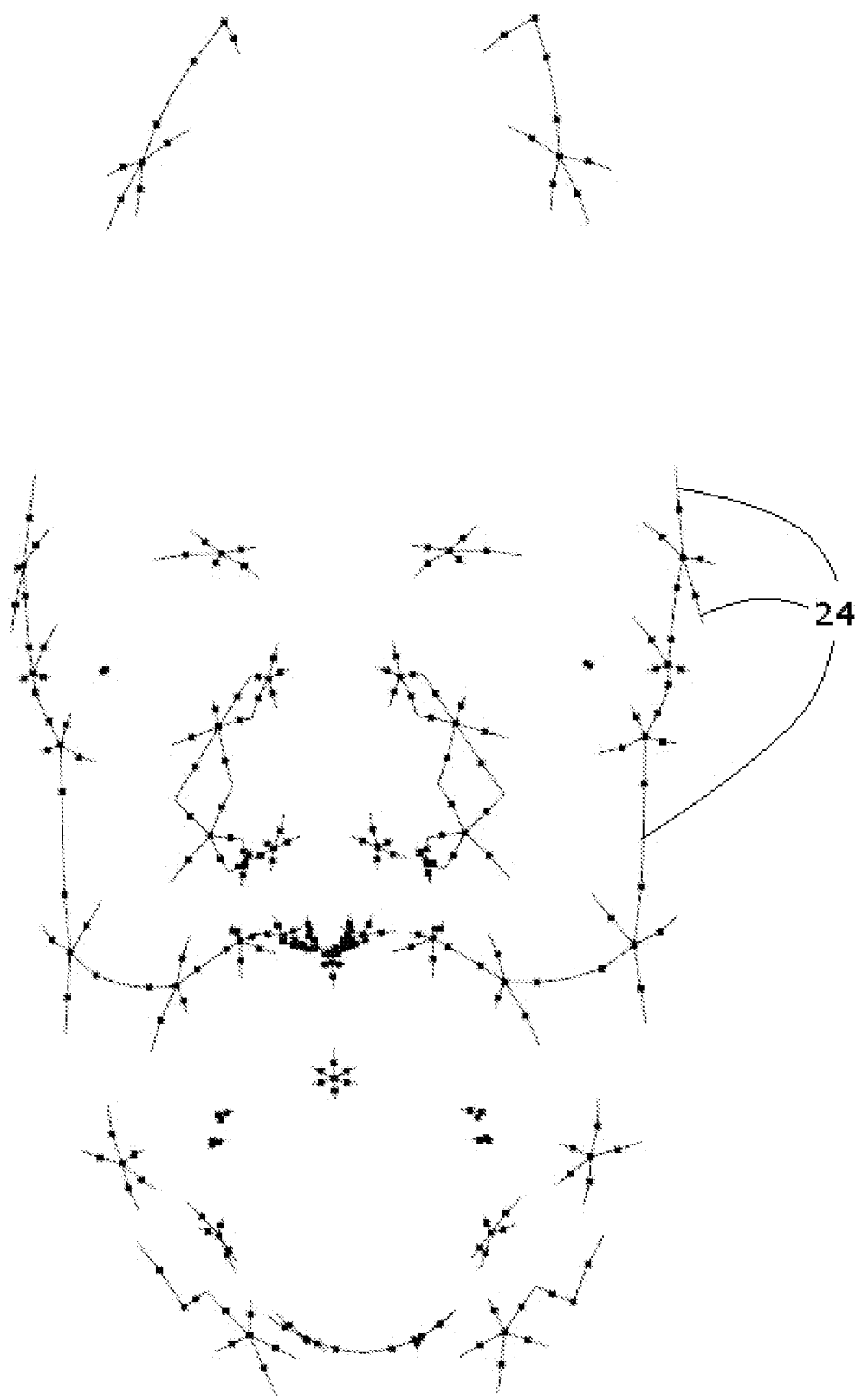
Figure 8:
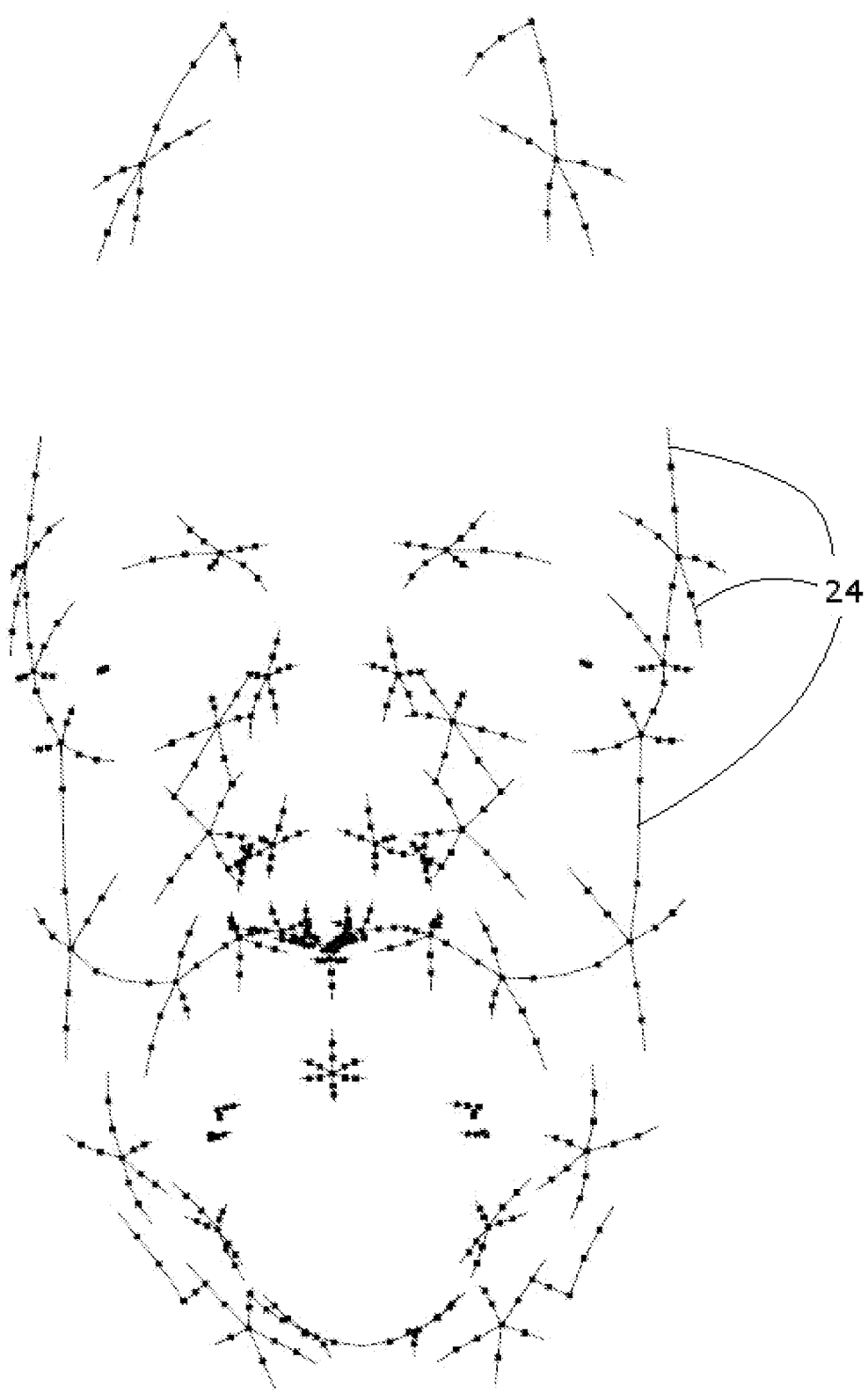
Figure 9:
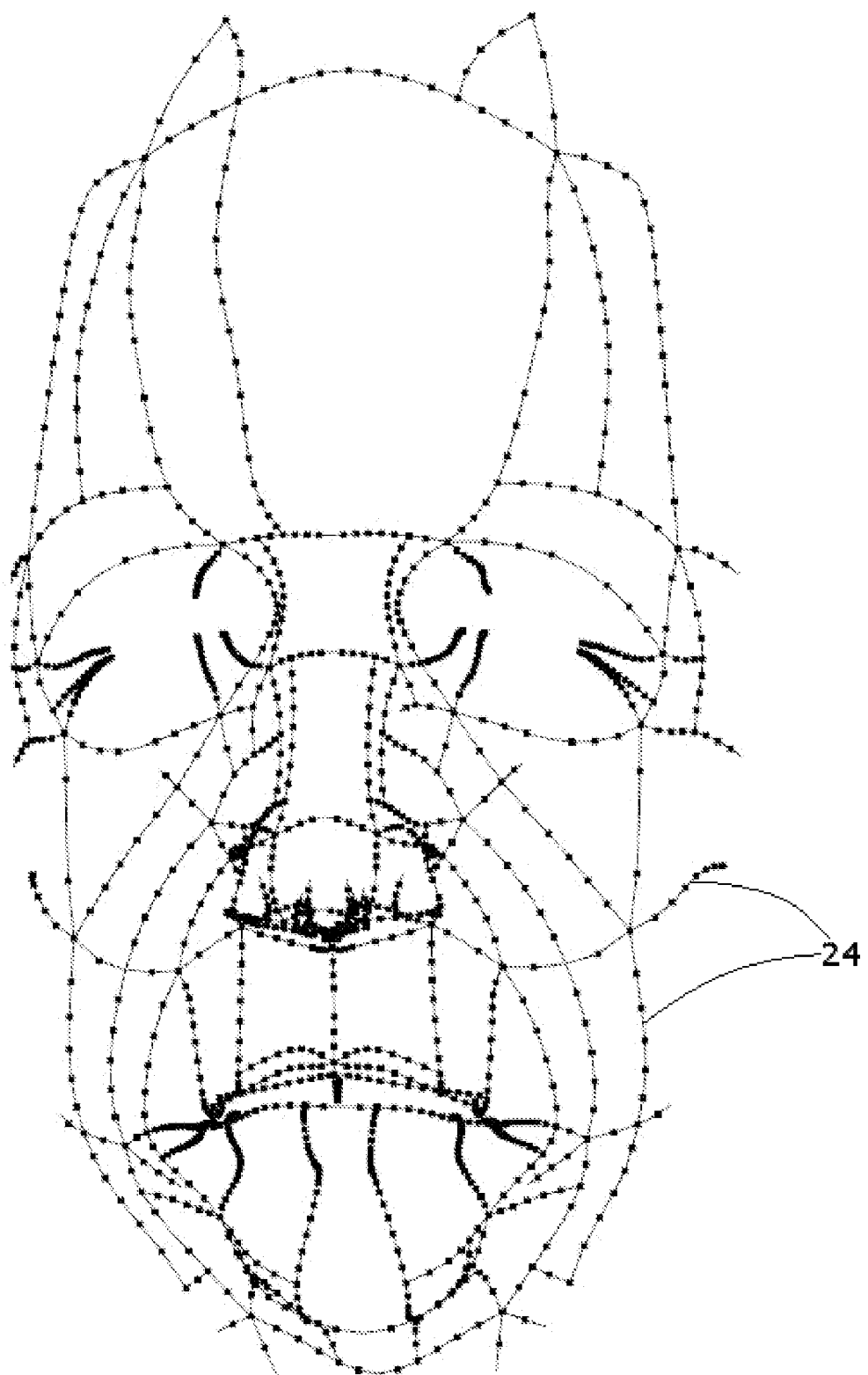

FIGS. 7 and 8 show progressive extensions of the surface boundary segments 24 started in FIG. 6. FIG. 9 shows the result of the boundary segments 24 starting with vertices having valence 5 or higher being fully extended.

Figure 10:
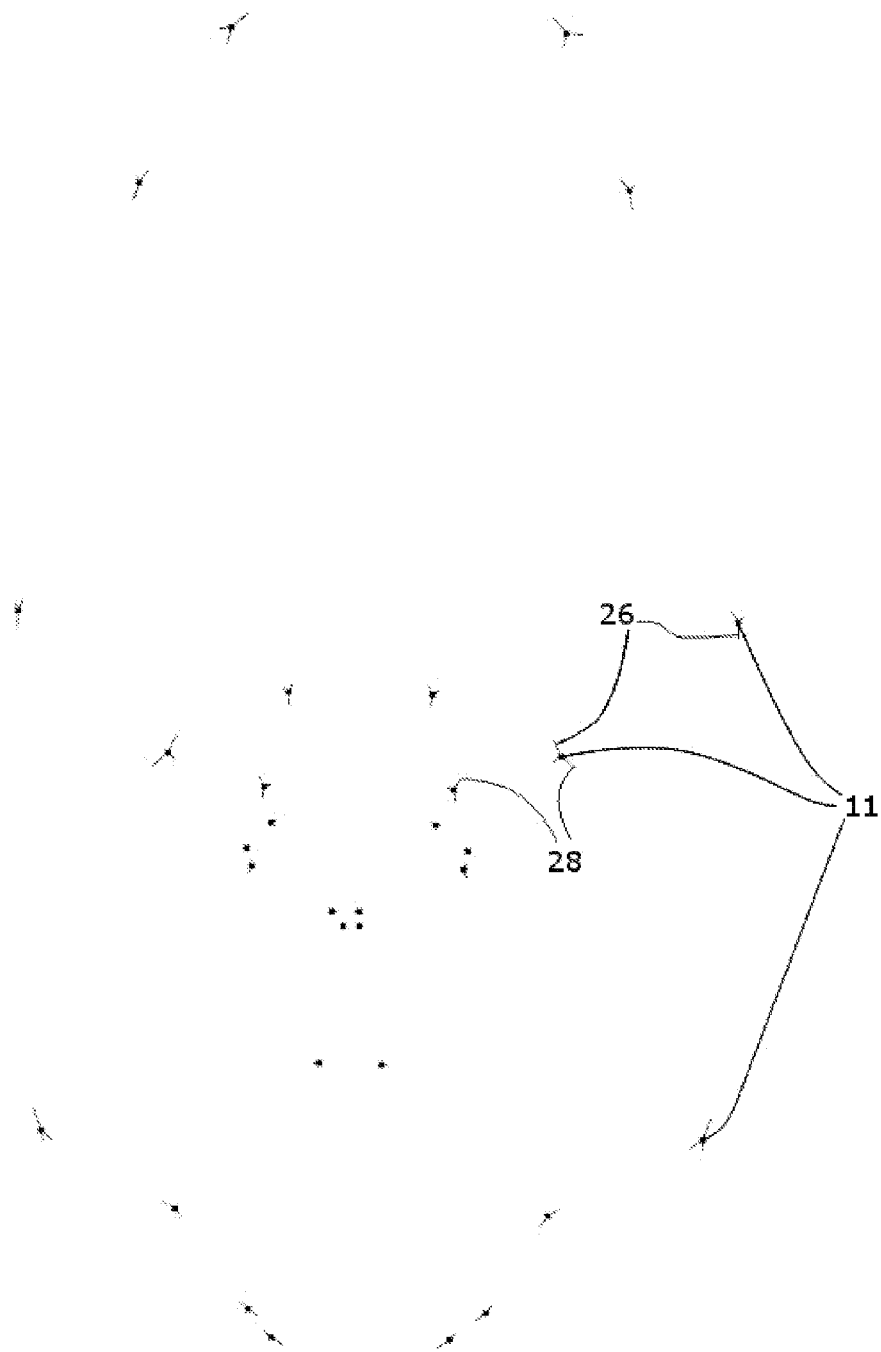

At 50 of FIG. 3 surface boundaries are defined using the vertices 11 having valence 3. As shown in FIG. 10, boundary segments 26 are formed starting with the vertices 11 having valence 3 and ending with the vertices 28 adjacent to the vertices 11 having valence 3, and include the continuous curve between the start and end vertices. To further define the boundaries, the boundary segments 26 are conditionally extended in a manner similar to the boundary segments 24 generated from the vertices having valence greater than 4. The rules for conditionally extending the boundary segments 26 may or may not include:

Boundary segments 26 are extended from valence 4 vertices so as to continue along the same continuous curve defined in 30 of FIG. 3.
  Boundary segments 26 are not extended if the last included vertex is non-valence 4.
  Curves along the boundary of the polygonal data form boundary segments.
  Boundary segments 26 are not extended if the last included vertex is in another boundary segment.
  Boundary segments 26 are not extended if areas of high curvature change are found In some embodiments, if a boundary segment 26 is terminated at a vertex of high curvature change, which has a valence of 4, additional boundary segments (not shown) are generated. The additional boundary segments start from the vertex of high curvature change, and extend in both directions along the continuous curve which intersects the continuous curve along which the terminated segment 26 was being extended. In some embodiments, a boundary segment is additionally started from the vertex of high curvature change and is extended in the direction along the continuous curve along which the terminated segment 26 was being extended.

In some embodiments, data points corresponding to vertices of high curvature change (for example, at the boundary of a flat surface and a surface with high curvature) are identified in the polygonal data independent of the process of extending boundary segments. The identified data points may be subsequently used as starting points for generating boundary segments using a process similar to those described above.

In some embodiments, the surface boundary segments are iteratively extended, such that during each iteration, each of the boundary segments being extended is extended to include an additional point which at least one of corresponds to a vertex of the polygonal data and is included on one of the continuous curves generated at 30 of FIG. 3. In some embodiments, all of or only the surface boundaries extended from vertices 12 having valence 5 and higher are extended during an iteration. In some embodiments, all of or only the surface boundaries extended from vertices 11 having valence 3 are extended during an iteration. In some embodiments, all of or only the surface boundaries extended from vertices of high curvature change are extended during an iteration.

In some embodiments, all of or only the surface boundaries extended from vertices 12 having valence 5 and higher are extended before surface boundaries extended from other vertices. In some embodiments, all of or only the surface boundaries extended from vertices 11 having valence 3 are extended before surface boundaries extended from other vertices. In some embodiments, all of or only the surface boundaries extended from vertices of high curvature change are extended before surface boundaries extended from other vertices.

Alternatively, all surface boundaries or surface boundaries started from vertices 12 having valence 5 and higher, vertices 11 having valence 3, and vertices of high curvature change may be extended during a single iteration.

In some embodiments, data points of the non-quadrilateral polygons are used as starting points from which boundary segments are extended. A process for extending the boundary segments form data points of the non-quadrilateral polygons may be similar to those discussed above.

Figure 11:
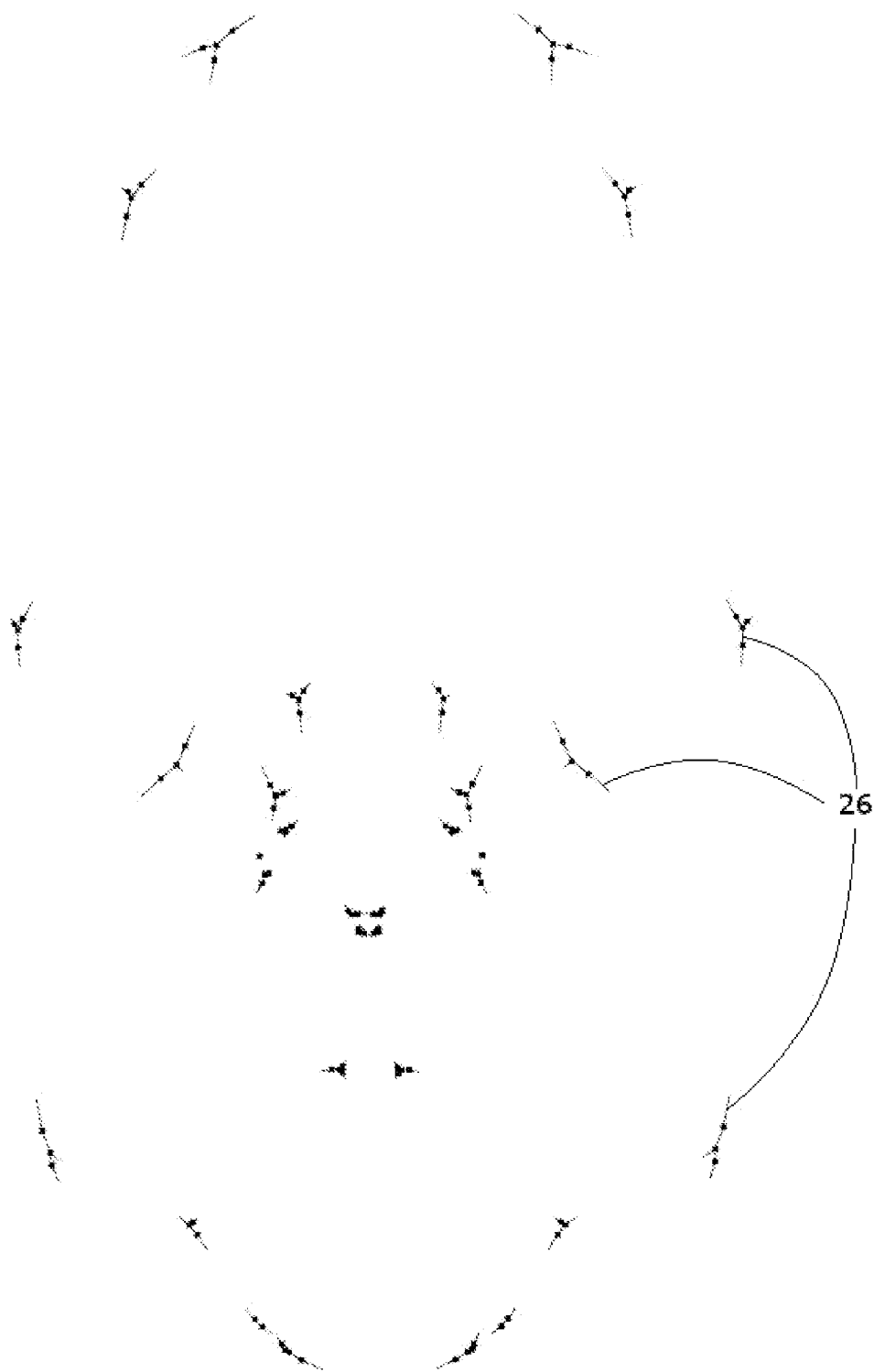
Figure 12:
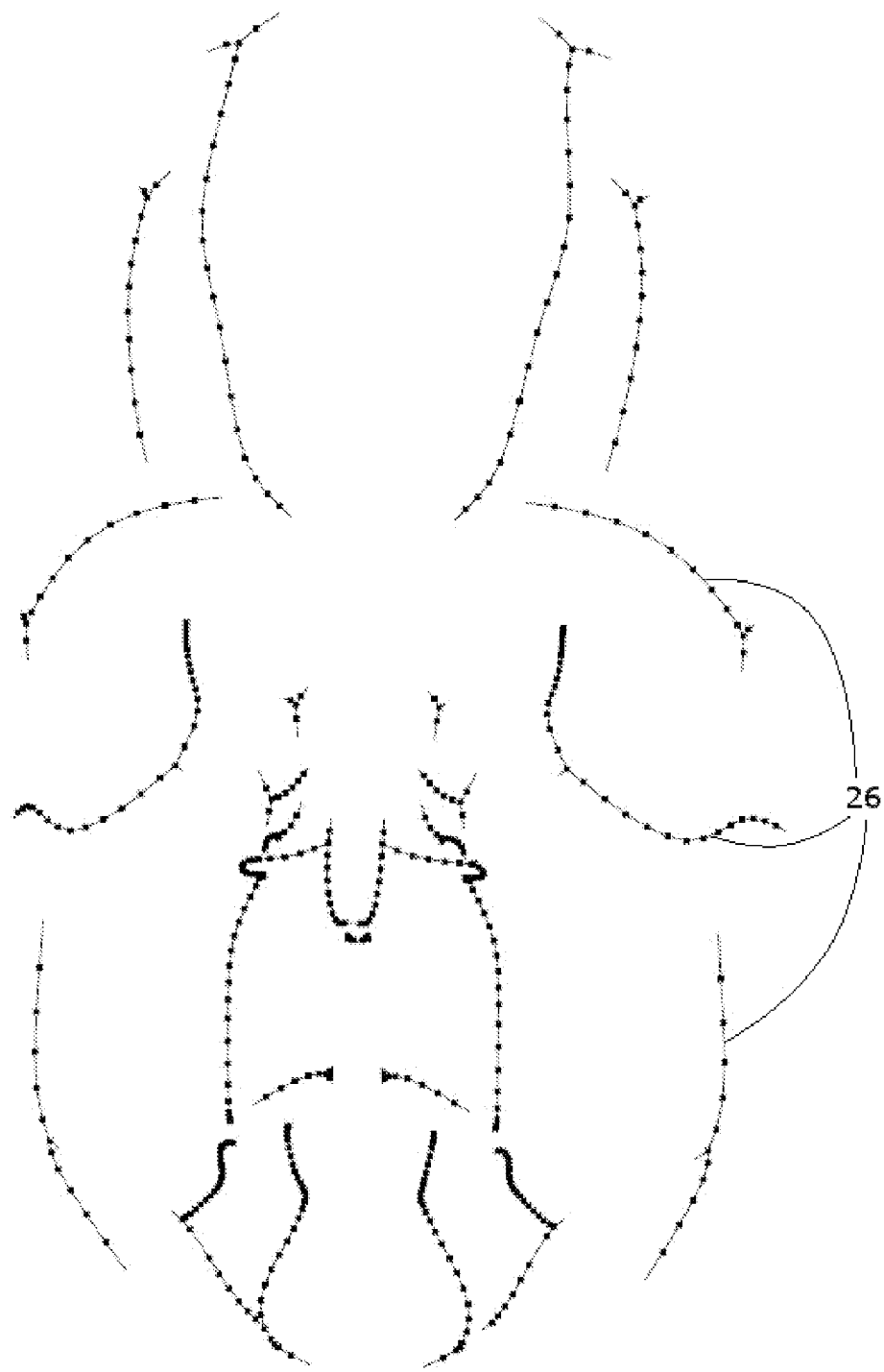
Figure 13:
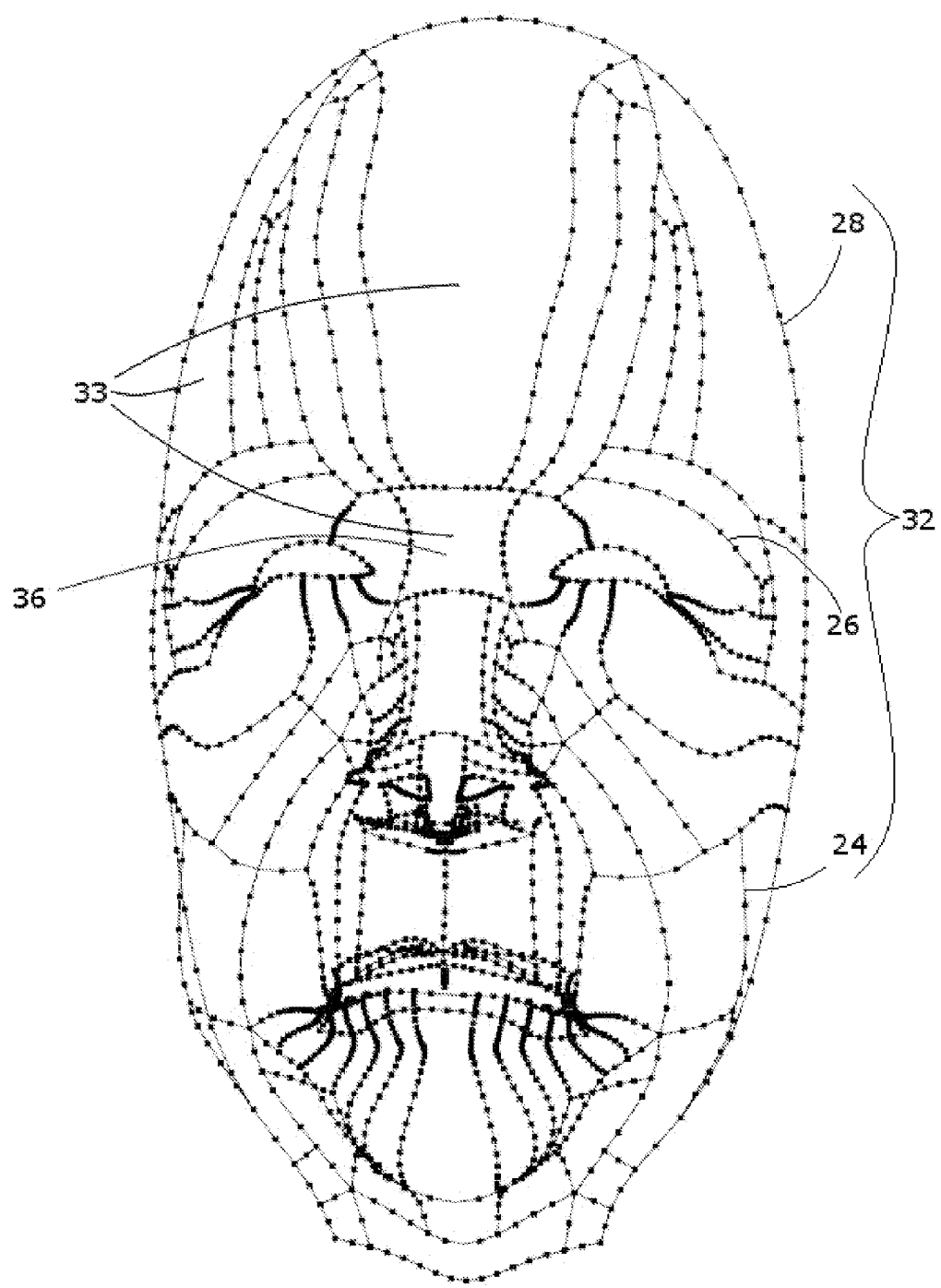

FIG. 11 shows extensions of the surface boundary segments 26 formed in FIG. 10. FIG. 12 shows the result of the boundary segments 26 starting with vertices 11 having valence 3 being fully extended. FIG. 13 shows the result of the boundary segments 24 starting with vertices 12 having valence 5 or higher being fully extended and the boundary segments 26 starting with vertices 11 having valence 3 being fully extended. Also shown in FIG. 13, with the addition of the surface boundary segments 28 defined by the continuous curves generated in 30 which include boundary vertices of the polygonal data, the surface boundaries 32 are fully formed and define the boundaries for the surfaces to be generated for surface locations 33 of the surface.

Figure 14:
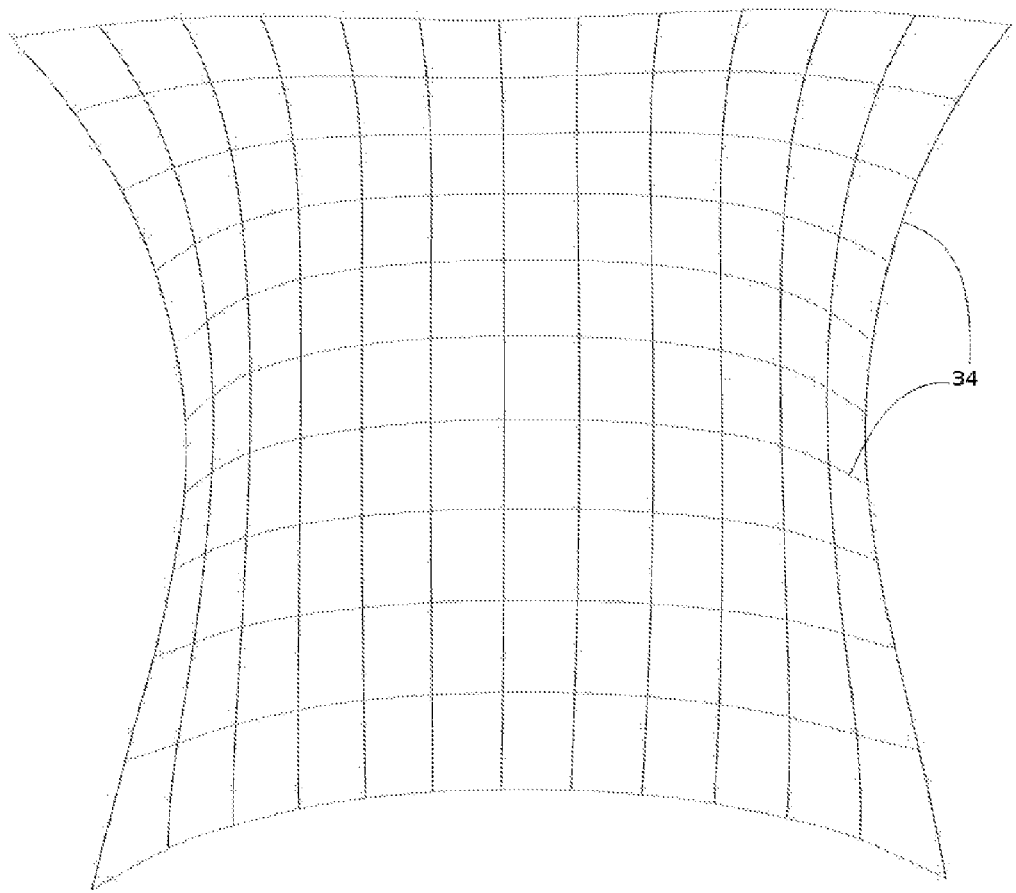
FIGS. 14-16 are graphical illustrations of surface generation.
Figure 15:
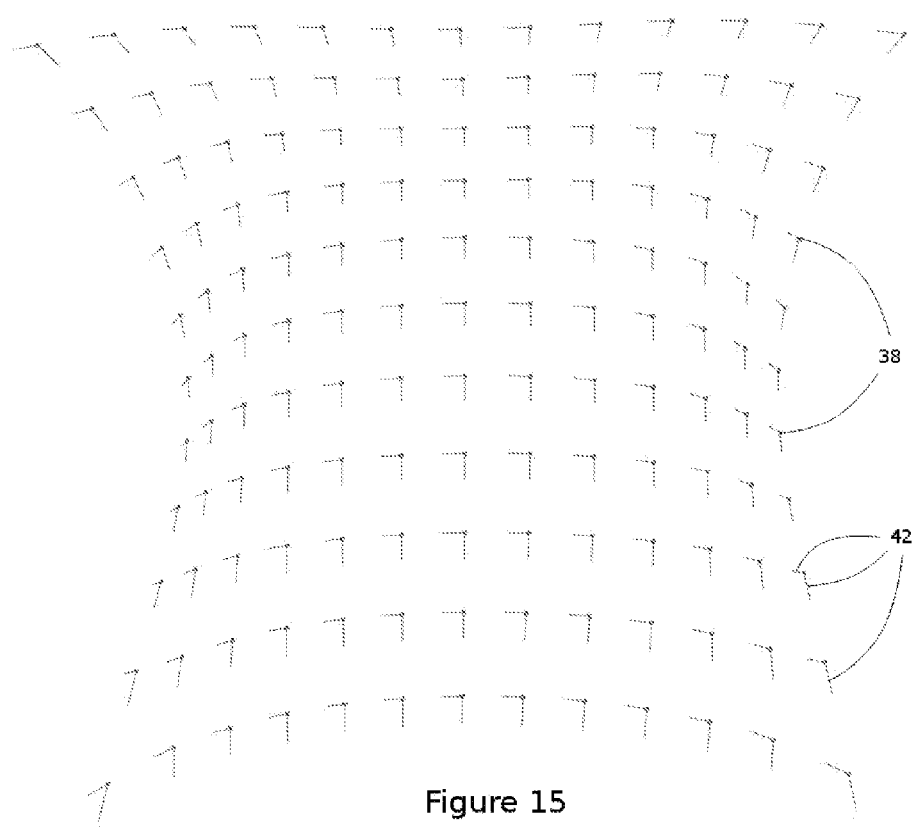

At 60 of FIG. 3, continuous surfaces are generated for each area 33 of the mesh surrounded by boundary segments. Portions 34 of the continuous curves generated at 30 of FIG. 3 which are within the bounded areas 33 are used to generate the surface for each area 33. Such a set of curve portions 34 is shown in FIG. 14, which shows curve portions 34 for a surface location 36 between the eyes, as shown in FIG. 13. FIG. 15 shows the vertices 38 in the surface location 36 along with tangent vectors 42 at each vertex. The tangent vectors 42 represent the slopes of the continuous curve portions 34 at the vertices 38.

Figure 16:
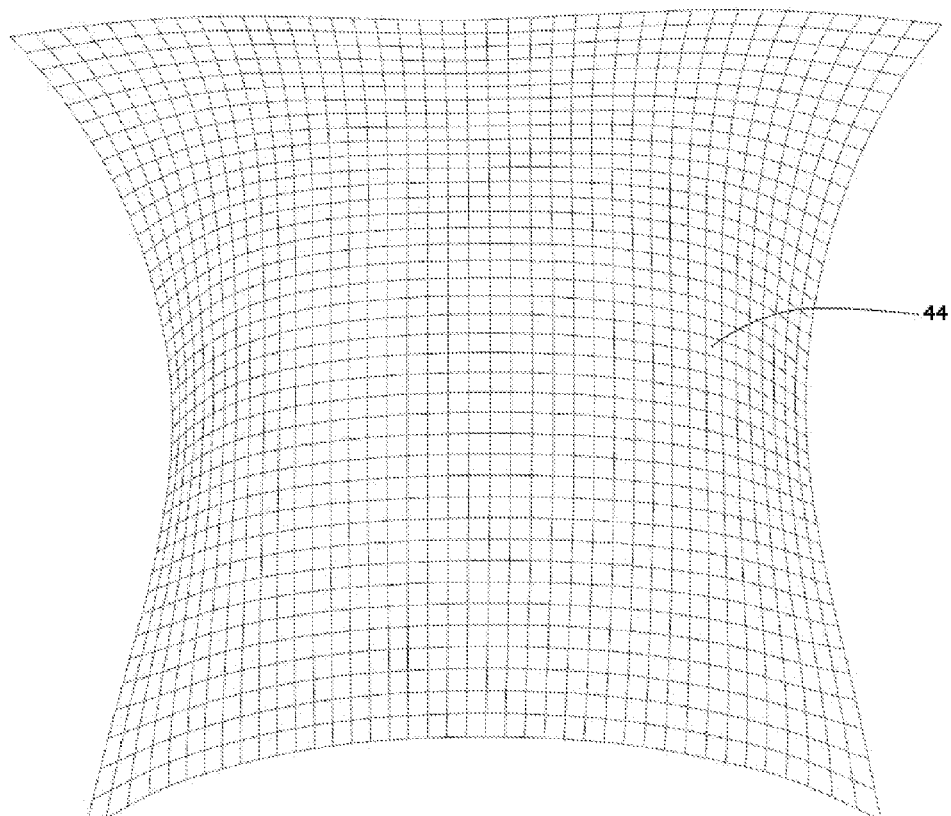

The curve portions 34, as shown in FIG. 14, and the tangent vectors 42, as shown in FIG. 15 may be used by a surface generation technique to define a continuous surface. FIG. 16 is a representation of the surface 44, which is a continuous surface 44 generated from the curve portions 34 of FIG. 14 and the tangent vectors 42 of FIG. 15. Some techniques for generating the continuous surface 44 include variational surfacing and/or least squares fitting. Other surface generation techniques may additionally or alternatively be used, such as another unordered data fitting technique. In some embodiments, the generated surface is a NURBS surface. The surface may be another type of surface. The generated surface may be G2 continuous. In some embodiments, the surface is not G2 continuous.

In order to generate the continuous BREP object corresponding to all of the polygonal data, a continuous surface is generated for each area 33 surrounded by boundary segments. The collection of continuous surfaces forms the continuous BREP corresponding to all of the polygonal data. Because the curves used to generate the surfaces are continuous the surfaces are internally continuous. In addition, the surface boundaries are continuous where the vertices on the boundary have valence 4. This is the case because the curves which cross the boundaries at vertices having valence 4 are continuous, as discussed above with reference to 30 of FIG. 3. Therefore, to improve the continuity of the entire generated BREP, at 70 of FIG. 3, the boundaries of the continuous surfaces near non-valence 4 vertices are analyzed and modified where needed.

Figure 17:
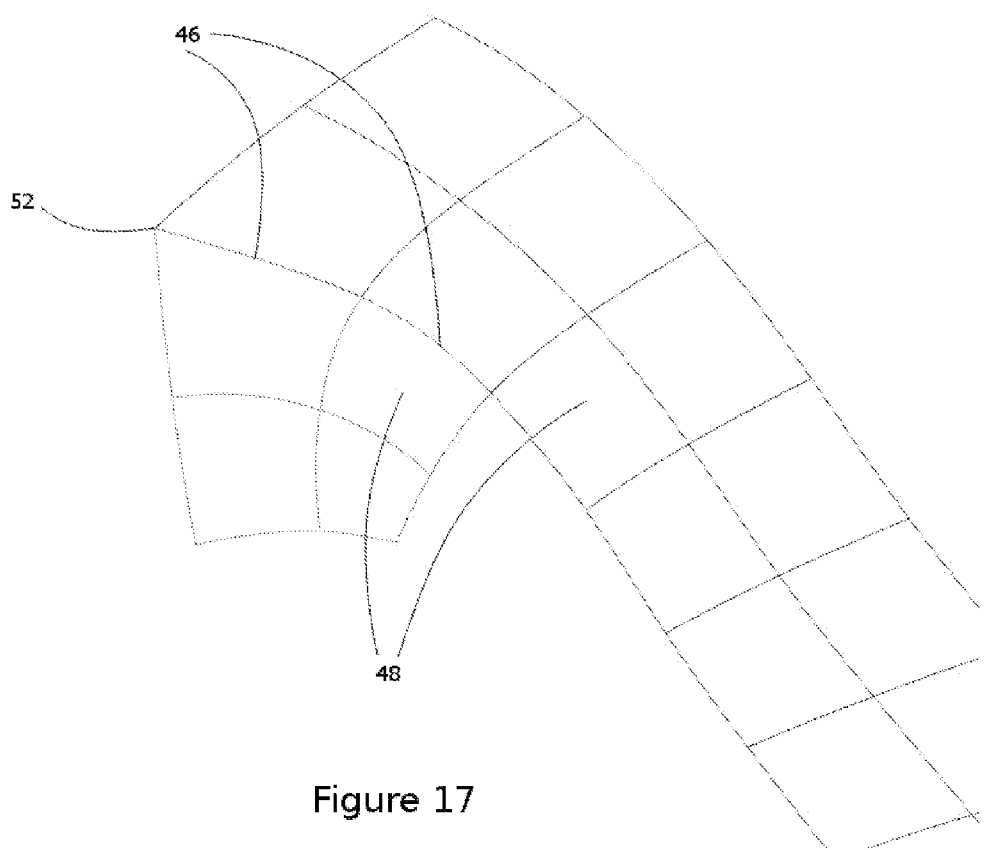
FIGS. 17-22 are graphical illustrations of surface boundary continuity improvement.
Figure 18:
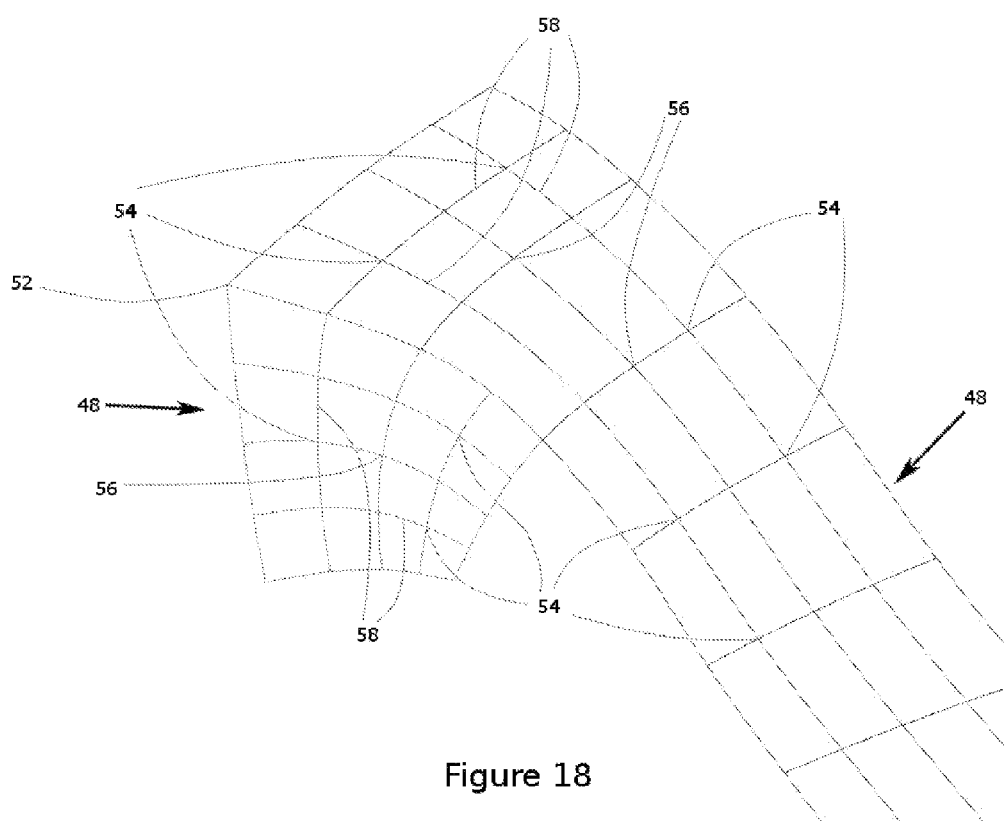

At some boundaries between a non-valence 4 vertex and the adjacent valence 4 vertex along the boundary, an unacceptable discontinuity may exist. FIG. 17 shows a boundary 46 between two surfaces 48 which has a valence 5 vertex 52. To determine and address the discontinuity, new knots 54 are added to the surfaces 48 sharing the boundary. The new knots 54 are added, as shown in FIG. 18 so as to be between the previously existing vertices 56. In some embodiments, the added knots 54 are located at a middle point between the previously existing vertices 56. While the discontinuity is concentrated near the non-valence 4 vertex 52, new knots 54 are added around the entire perimeter of each surface 48 to avoid high aspect ratio portions of the surface data near the non-valence 4 surface vertex 52. Using a process similar to that discussed above with reference to FIG. 14, continuous curves 58 are generated from the new vertices 56 on each surface 48, as shown in FIG. 18. In addition, using a process similar to that discussed above with reference to FIG. 15, tangent vectors 62 are determined at each of the old and new vertices, as shown in FIG. 19.

Figure 19:
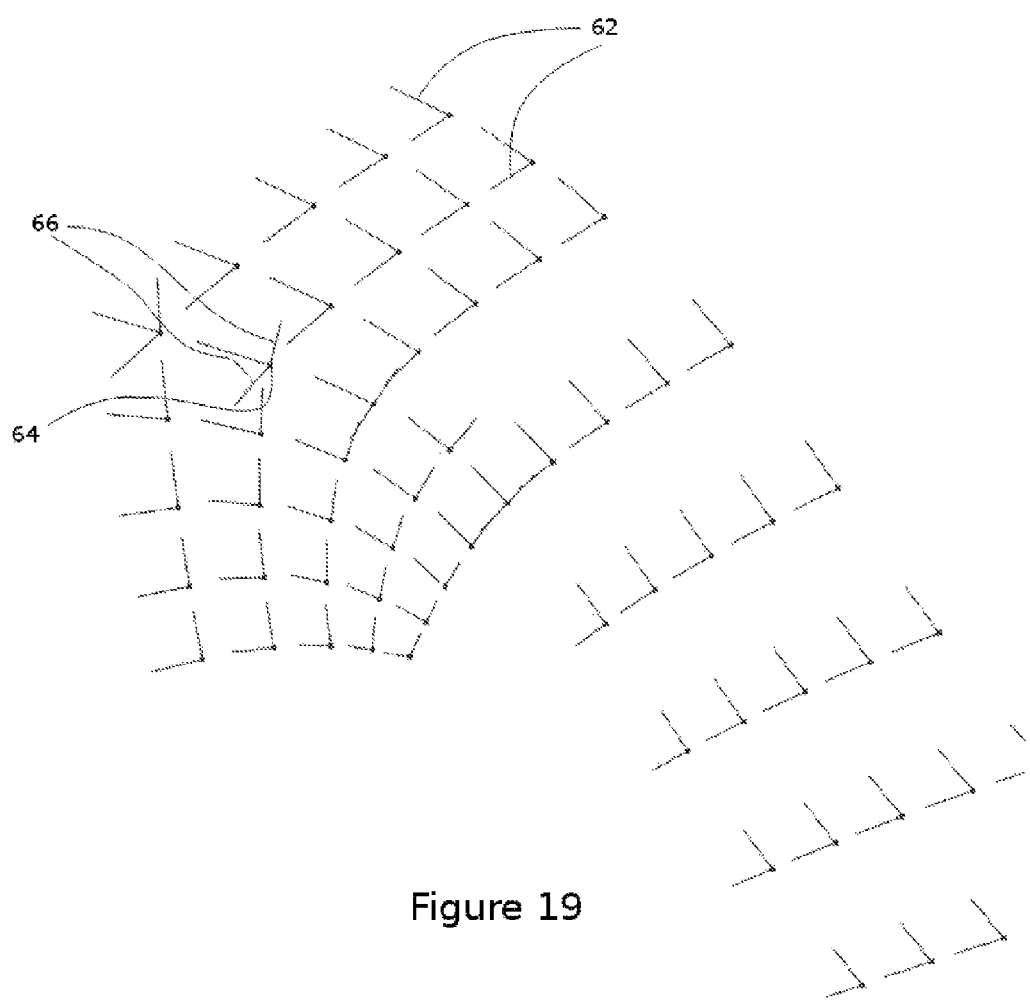
Figure 20:
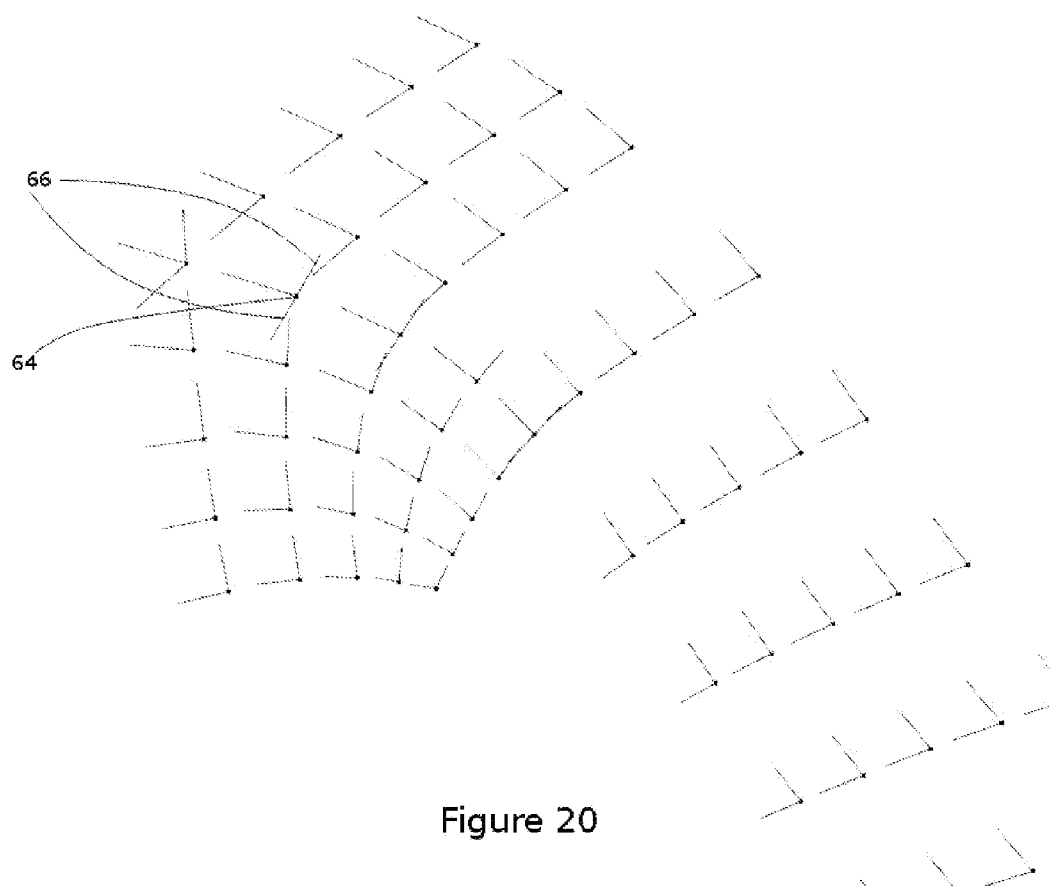
Figure 21:
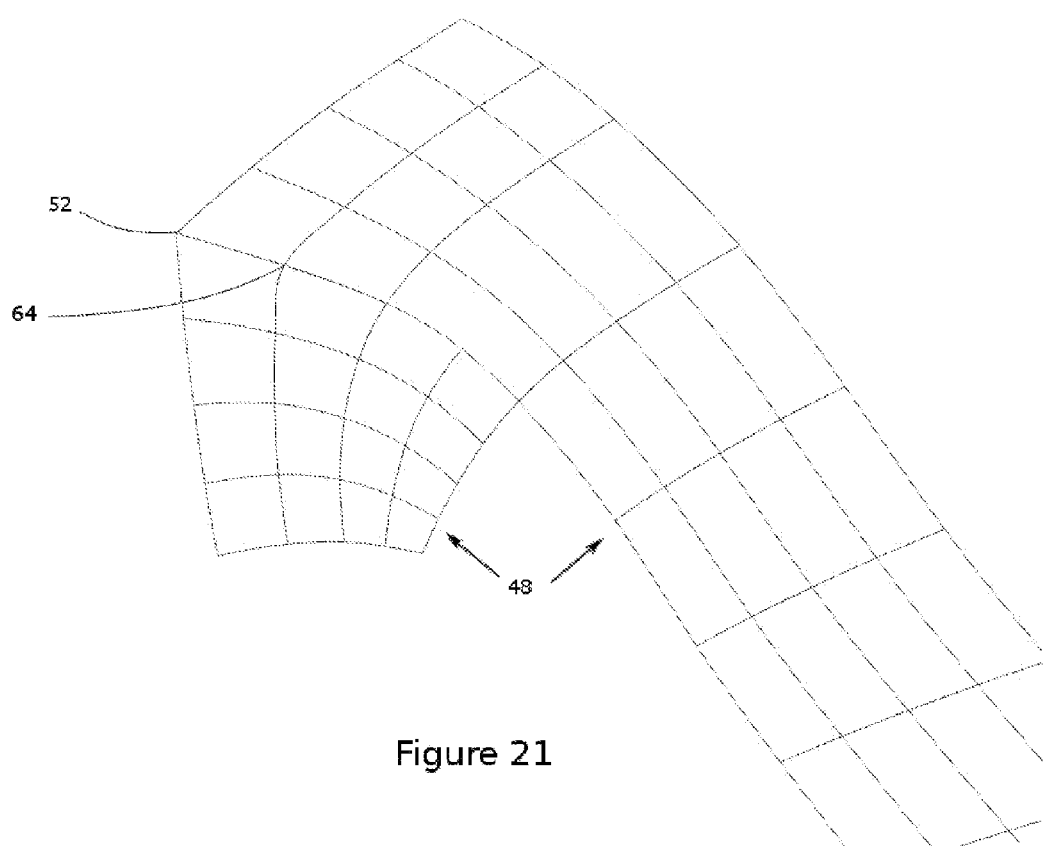

As shown in FIG. 19, the new vertex 64 on the boundary nearest the valence 5 vertex has two tangent vectors 66. The tangent vectors 66 are from the continuous curves of both surfaces 48 sharing the boundary. As shown in FIG. 19, the two tangent vectors 66 are not parallel. This indicates a discontinuity between the curves and between the surfaces at the new vertex 64. The angle between the two tangent vectors 66 is a measure of the discontinuity. To improve the continuity of the boundary, the two tangent vectors 66 may be modified so as to be equal and opposite, for example, by modifying each tangent vector 66 by a common amount. In some embodiments, the tangent vectors 66 are modified by different amounts. In some embodiments, the location of one or more of the new and/or old vertices is changed to reduce the angle between the tangent vectors 66. In some embodiments, the continuity is improved only if the angle is greater than a threshold, for example, 1 degree or 1 percent. FIG. 20 shows that, after modification, the tangent vectors 66 of the new vertex 64 are equal and opposite. Accordingly, a curve through the new vertex 64 from one surface to the other is G1 continuous. In some embodiments, the new and/or old vertices near the new vertex 64 are modified so that the curve through the new vertex 64 from one surface to the other is G2 continuous. FIG. 21 shows the surfaces 48 after the continuity between the surfaces 48 near the valence 5 vertex 52 has been improved. Once the tangent vectors are satisfactory, each of the affected surfaces is regenerated based on data which includes the new vertices and tangent vectors.

Figure 22:
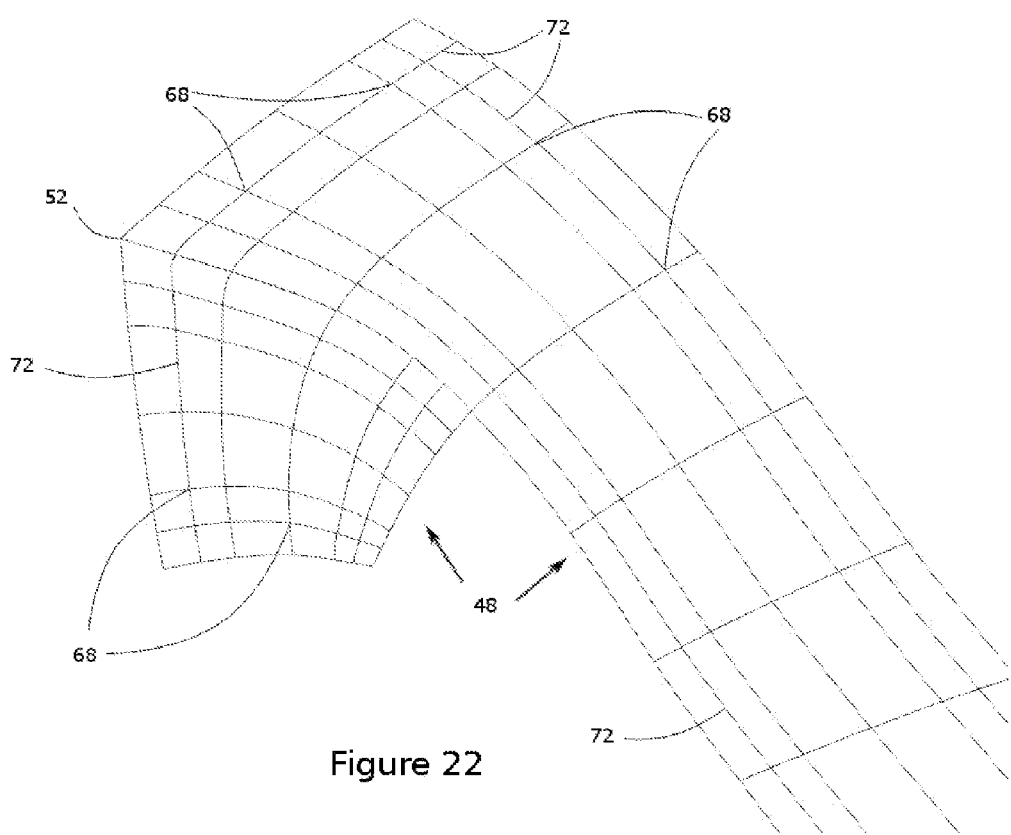

In some embodiments, improvement of the continuity near the non-valence 4 vertex is repeated. For example, if the angle between the tangent vectors 66 prior to modification is greater than a threshold, the improvement process may be repeated. FIG. 22 shows the surfaces 48 after the continuity between the surfaces near the valence 5 vertex 52 has been improved a second time. As shown, the second improvement process added new vertices 68 and continuous curves 72 including the new vertices 68.

Figure 23:
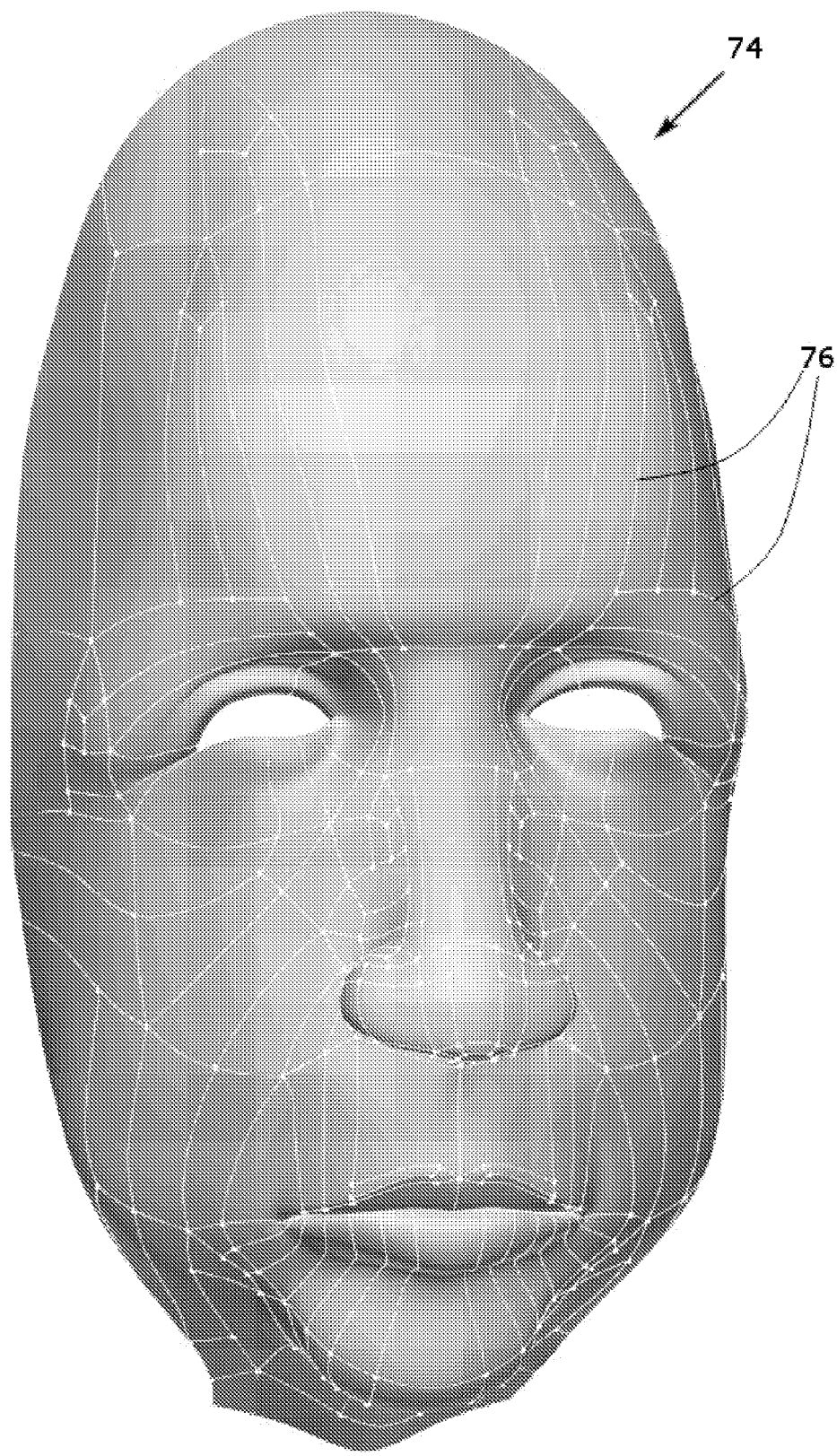
FIGS. 23-25 are graphical illustrations of continuous BREP object data generated by the processes describe with reference to FIGS. 3-22.
Figure 24:
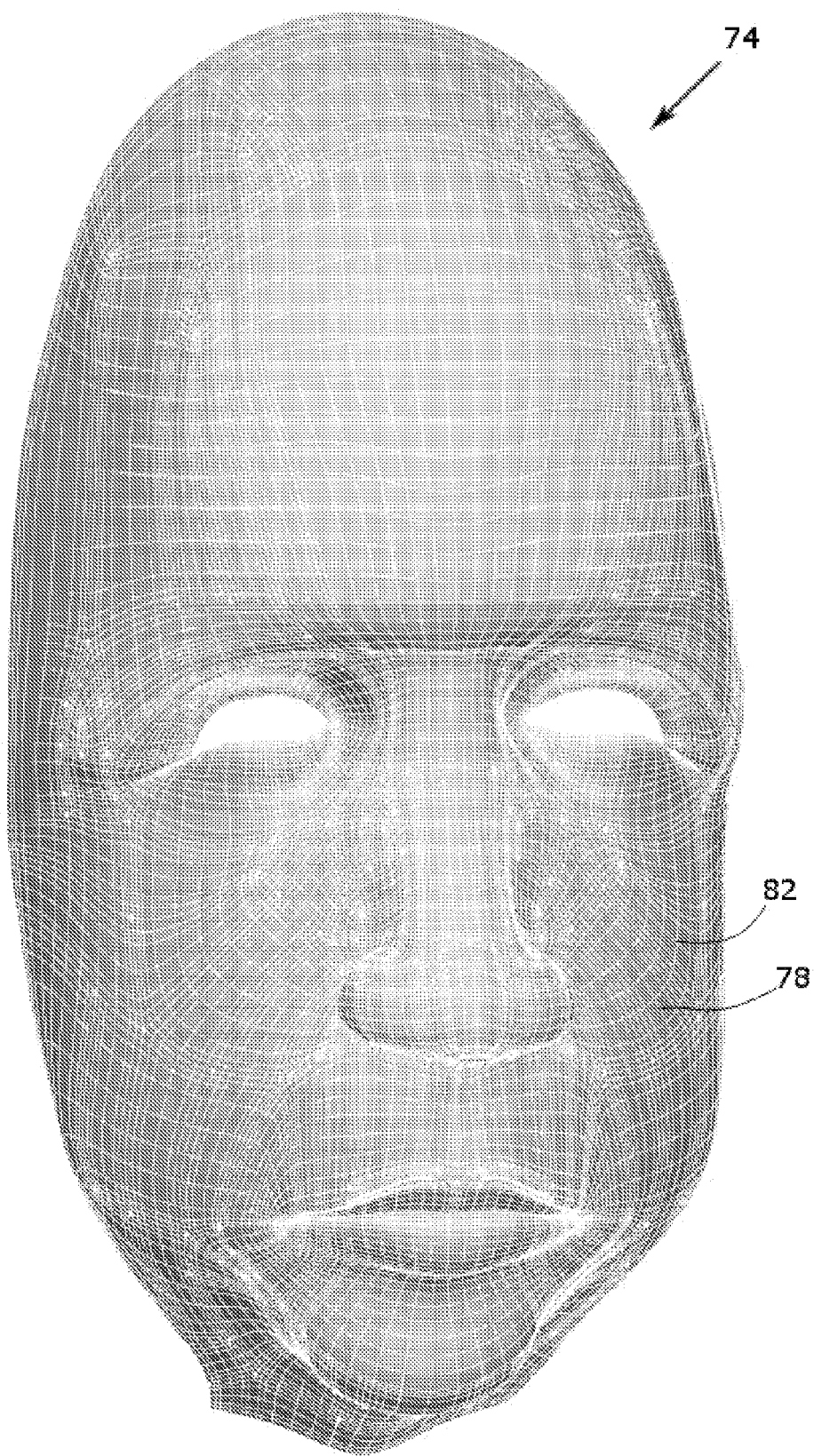

FIG. 23 shows the continuous surface 74 generated by the method of FIG. 3, with the surface boundaries 76. FIG. 24 shows the continuous surface 74 generated by the method of FIG. 3, with the continuous curves 78 and vertices 82.

The generated BREP 74 may contain a NURBS surface, and may be G2 continuous at all or substantially all points, and may be G1 continuous at points which are not G2 continuous. Once data representing the continuous BREP object 74 is generated, the data may be stored in a non-transitory computer readable medium, such as a memory storage device. The data may be used to generate an electronic or printed image of the continuous BREP object. The data may also be used to generate a physical representation or instructions for generating a physical representation of the continuous BREP.

Figure 25:

FIG. 25 shows a zebra stripe analysis 82 of the continuous BREP 74 generated by the method of FIG. 3. As shown the zebra stripe analysis indicates that the continuity of the continuous BREP generated by the method of FIG. 3 is excellent.

The various aspects, processes, actions may be performed sequentially or in parallel. For example, a system capable of parallel processing may divide certain procedures among the available processing devices.

While various aspects, processes, actions, and systems have been described as being included in the embodiments discussed, the various aspects, processes, actions, and systems can be practiced with certain modifications. For example, the sequential order of the various aspects, processes, and actions may be modified. In addition, certain aspects, processes, and actions may be omitted, and other aspects, processes, and actions may be added.

What is claimed is:
1. A method of producing BREP data from electronic polygonal data, the method comprising:
    accessing the polygonal data with a computer, the polygonal data defining a mesh of polygonal data points, each having a valence corresponding with the number of polygons defined thereby, wherein the data points comprise:
        a plurality of valence four data points having a valence of four, and
        a plurality of non-valence four data points having a valence other than four;
    selecting one or more of the non-valence four data points, wherein the selected non-valence four data points are selected at least partly on the basis of having a valence other than four;
    generating a plurality of continuous curves based on the polygonal data;
    identifying a plurality of first data points corresponding to non-valence 4 vertices in the polygonal data;
    identifying a plurality of second data points corresponding to polygonal data having a third derivative greater than a threshold;
    based at least in part on the continuous curves, the first data points, and the second data points, generating a plurality of BREP surface boundaries defining one or more continuous BREP surfaces, wherein each of the continuous BREP surface boundaries terminates on one of the selected non-valence four data points and passes through one or more particular valence four data points;
    generating the BREP data based at least in part on the continuous BREP surfaces;
    generating one or more additional continuous surfaces, each additional surface being generated based on points corresponding to vertices in the polygonal data which are near one of the non-valence 4 vertices corresponding to an identified non-valence 4 data point, wherein at least one of the additional continuous surfaces terminates at at least one of the second data points;

improving the continuity of the BREP data using the continuous additional surfaces; and storing the improved BREP data in a computer readable data storage.

2. The method of claim 1, wherein the continuous curves include the points of the mesh.

3. The method of claim 1, wherein the continuous curves are G2 continuous.

4. The method of claim 1, wherein the BREP surface boundaries intersect one or more of the curves.

5. The method of claim 1, wherein the surface boundaries are G2 continuous at points corresponding to valence 4 vertices in the polygonal data.

6. The method of claim 1, wherein improving the continuity of the BREP data comprises modifying an identified first data point based on one of the additional continuous surfaces.

7. The method of claim 1, wherein improving the continuity of the BREP data comprises adding a plurality of knots to the BREP data based on one of the additional continuous surfaces.

8. The method of claim 1, wherein generating the BREP surface boundaries comprises extending surface boundary segments from the identified first data points.

9. The method of claim 1, wherein generating the BREP surface boundaries comprises extending surface boundary segments from the second data points.

10. The method of claim 1, wherein each first vertex having valence n corresponds to a point on the BREP surface boundary of n of the continuous BREP surfaces, wherein n is an integer.

11. A method of producing BREP data from electronic polygonal data, the method comprising:
    accessing the polygonal data with a computer, the polygonal data defining a mesh of polygonal data points, each having a valence corresponding with the number of polygons defined thereby, wherein the data points comprise:
        a plurality of valence four data points having a valence of four, and
        a plurality of non-valence four data points having a valence other than four;
    selecting one or more of the non-valence four data points, wherein the selected non-valence four data points are selected at least partly on the basis of having a valence other than four;
    identifying a plurality of high curvature data points, each identified high curvature data point corresponding to a non-valence 4 vertex in the polygonal data;
    identifying a plurality of second data points corresponding to polygonal data having a third derivative greater than a threshold;
    generating a plurality of BREP surface boundaries defining one or more continuous BREP surfaces, wherein each of the continuous BREP surface boundaries terminates on one of the selected non-valence four data points and passes through one or more particular valence four data points;
    generating one or more continuous surfaces, each generated surface being generated based on points corresponding to vertices in the polygonal data which are near one of the non-valence 4 vertices corresponding to an identified data point, wherein at least one of the one or more continuous surfaces terminates at at least one of the second data points;
    identifying a plurality of second data points corresponding to polygonal data having a third derivative greater than a threshold;
    generating the BREP data based at least in part on the continuous surfaces and the second data points;
    improving the continuity of the BREP data using the continuous surface; and
    storing the BREP data in a computer readable data storage.

12. The method of claim 11, wherein each continuous surface is G2 continuous.

13. The method of claim 11, wherein each continuous surface is generated based on points corresponding to vertices which are adjacent to the corresponding non-valence 4 vertex.

14. The method of claim 11, wherein each continuous surface is generated based on points corresponding to vertices which substantially surround the corresponding non-valence 4 vertex.

15. The method of claim 11, wherein improving the continuity of the BREP data comprises modifying each identified point based on the corresponding continuous surface.

16. The method of claim 12, wherein modifying each identified point comprises projecting the identified point onto the corresponding continuous surface at a projection point.

17. The method of claim 16, wherein each continuous surface is normal to the corresponding identified point at the projection point.

18. The method of claim 11, wherein improving the continuity of the BREP data comprises adding a plurality of knots to the BREP data based on each continuous surface.

19. The method of claim 18, wherein improving the continuity of the BREP data comprises modifying each identified point based on the corresponding continuous surface, and wherein the knots are added between each modified point and other points corresponding to adjacent points.

20. The method of claim 18, wherein the plurality of surface boundaries define one or more additional continuous surfaces, wherein generating the BREP data is based at least in part on the additional surfaces, and wherein the knots are added on the additional surfaces.

21. The method of claim 20, further comprising improving the continuity of the knots added on the boundaries defining the additional surfaces.

22. The method of claim 21, wherein improving the continuity of the knots added on the boundaries comprises:
    generating a continuous curve on each of the additional surfaces which share a boundary, wherein each continuous curve on each additional surface includes knots added on the surface and has an added knot on the shared boundary as an end point;
    determining a tangent for each of the added knots on each curve, wherein the added knot on the shared boundary has a first tangent from a first curve on a first additional surface and a second tangent from a second curve on a second additional surface;
    modifying the first and second tangents so as to be parallel; and
    regenerating the first and second additional surfaces based at least in part on the added knots and the tangents of the added knots.

23. The method of claim 11, further comprising generating a plurality of surface boundaries defining one or more additional continuous surfaces, wherein the identified points correspond to points on the surface boundaries.

\* \* \* \* \*